US011598654B2

(12) United States Patent
Shaga

(10) Patent No.: US 11,598,654 B2
(45) Date of Patent: Mar. 7, 2023

(54) HIGH RESOLUTION ANGULAR INDUCTIVE SENSOR AND ASSOCIATED METHOD OF USE

(71) Applicant: Microchip Technology Inc., Chandler, AZ (US)

(72) Inventor: Ganesh Shaga, Warangal (IN)

(73) Assignee: Microchip Technology Inc., Chandler, AZ (US)

( * ) Notice: Subject to any disclaimer, the term of this patent is extended or adjusted under 35 U.S.C. 154(b) by 19 days.

(21) Appl. No.: 17/359,694

(22) Filed: Jun. 28, 2021

(65) Prior Publication Data
US 2022/0187335 A1    Jun. 16, 2022

(30) Foreign Application Priority Data
Dec. 14, 2020    (IN) .............................. 202021054245

(51) Int. Cl.
*G01D 5/20*    (2006.01)
*G01P 3/488*    (2006.01)

(52) U.S. Cl.
CPC ............ *G01D 5/2053* (2013.01); *G01P 3/488* (2013.01)

(58) Field of Classification Search
CPC .... G01D 5/204; G01D 5/2053; G01D 5/2073; G01D 5/2086; G01D 5/22; G01D 5/2208;
(Continued)

(56) References Cited

U.S. PATENT DOCUMENTS 3,197,763 A * 7/1965 Fisher ..................... H03M 1/00
  341/15
3,281,826 A * 10/1966 Moffitt .................... H03M 1/00
  307/406
(Continued)

FOREIGN PATENT DOCUMENTS

DE    102015220615 A1    4/2017
EP         0845659 A2    6/1998
(Continued)

OTHER PUBLICATIONS

PCT/US2021/039578, International Search Report and Written Opinion, European Patent Office, dated Oct. 14, 2021.

*Primary Examiner* — Steven L Yeninas
(74) *Attorney, Agent, or Firm* — Glass and Associates; Molly Sauter; Kenneth Glass

(57) ABSTRACT

An angular position sensor comprising two annular sensors, one annular sensor for generating a coarse resolution time varying signal in the presence of a rotatable inductive coupling element and the other annular sensor for generating a fine resolution time varying signal in the presence of the rotatable inductive coupling element. The rotatable inductive coupling element comprising a first annular portion comprising at least one annular conductive sector and at least one annular non-conductive sector and a second annular portion comprising at least one annular conductive sectors and at least one annular non-conductive sector, wherein the number of annular conductive sectors of the first annular portion and the second annular portion are different. In particular, the annular conductive sectors of the annular portions may comprise 50% or 75% of the total area of the annular portions.

27 Claims, 13 Drawing Sheets

(58) Field of Classification Search
CPC .... G01D 5/2225; G01D 5/225; G01D 5/2275; G01D 5/2291
See application file for complete search history.

(56) References Cited

U.S. PATENT DOCUMENTS

| | | | |
|---|---|---|---|
| 4,737,698 A | 4/1988 | McMullin et al. | |
| 6,111,402 A * | 8/2000 | Fischer | G01D 5/2046 341/15 |
| 7,385,389 B2 * | 6/2008 | Tahara | G01D 5/2086 324/207.17 |
| 7,719,264 B2 * | 5/2010 | Tiemann | G01D 5/20 324/207.16 |
| 8,278,911 B2 * | 10/2012 | Tiemann | G01D 5/2457 324/207.25 |
| 8,339,126 B2 * | 12/2012 | Izak | G01D 5/2053 324/207.16 |
| 8,451,000 B2 * | 5/2013 | Tiemann | G01D 5/20 324/207.25 |
| 8,947,077 B2 | 2/2015 | Lee et al. | |
| 9,234,771 B2 * | 1/2016 | Sasaki | G01D 5/2452 |
| 9,322,636 B2 | 4/2016 | Fontanet | |
| 9,528,858 B2 | 12/2016 | Bertin | |
| 10,415,952 B2 | 9/2019 | Reddy et al. | |
| 10,444,037 B2 | 10/2019 | Bertin | |
| 10,760,928 B1 | 9/2020 | Shaga et al. | |
| 10,921,155 B2 | 2/2021 | Shaga et al. | |
| 2007/0001666 A1 | 1/2007 | Lee | |
| 2008/0054887 A1 | 3/2008 | Lee | |
| 2018/0120083 A1 * | 5/2018 | Reddy | G01B 7/30 |
| 2018/0274948 A1 * | 9/2018 | Maniouloux | G01P 3/505 |
| 2019/0017845 A1 | 1/2019 | Utermoehlen et al. | |
| 2019/0186891 A1 | 6/2019 | Utermoehlen et al. | |
| 2021/0372823 A1 * | 12/2021 | Witts | G01D 5/225 |

FOREIGN PATENT DOCUMENTS

| | | | |
|---|---|---|---|
| EP | 3245485 A1 | 11/2017 | |
| EP | 2145158 B1 | 3/2018 | |
| GB | 2394293 A | 4/2004 | |
| WO | WO-2008087545 A2 * | 7/2008 | G01D 5/2046 |

* cited by examiner

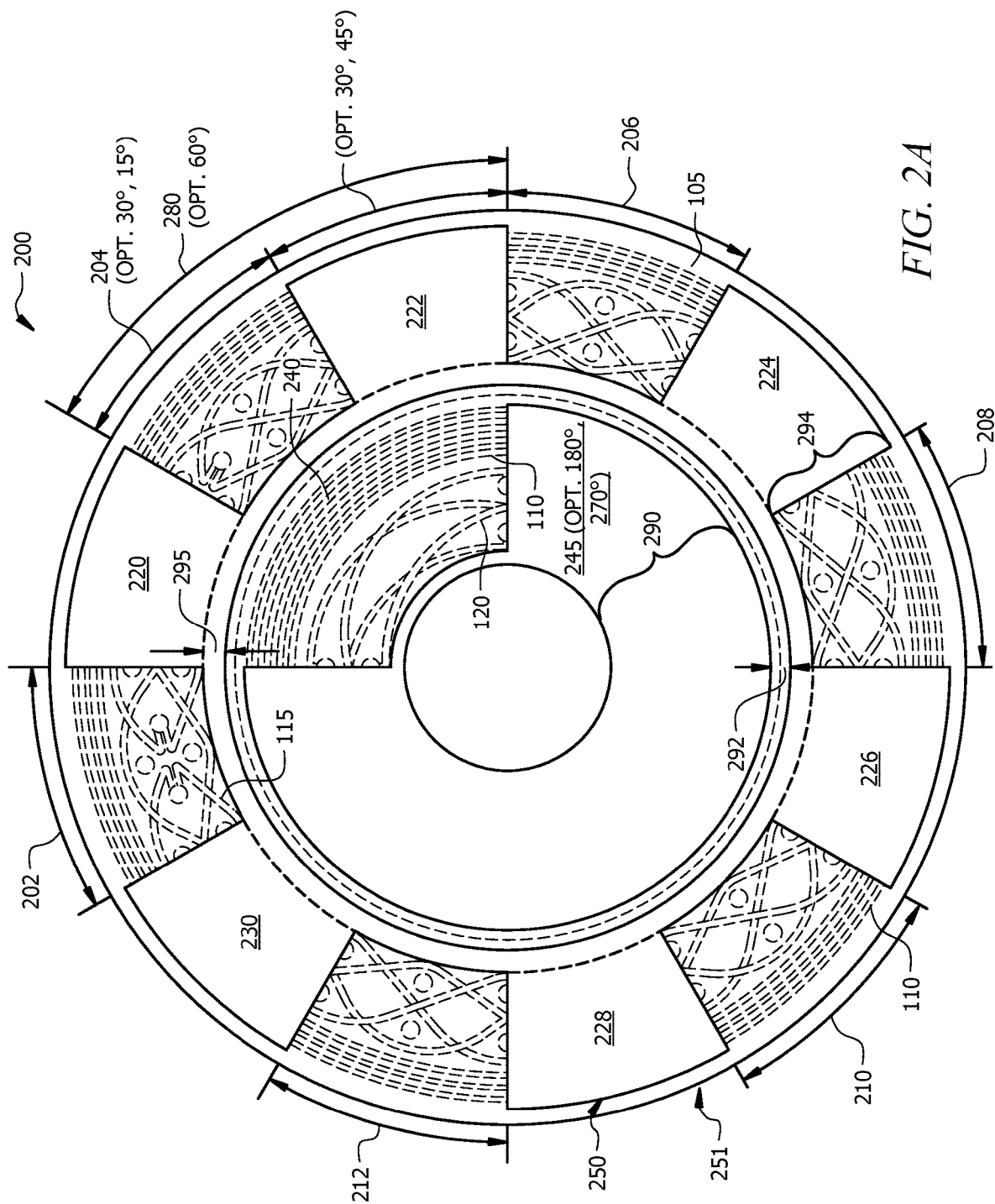

800 ⟶

┌─────────────────────────────────────────────────────────────────┐
│ ESTABLISHING A MAGNETIC COUPLING IN A FIRST ANNULAR SENSOR, THE │
│ FIRST ANNULAR SENSOR COMPRISING A FIRST PLANAR EXCITATION COIL  │ ⟵ 805
│           AND A FIRST PLANAR SENSING COIL PAIR                  │
└─────────────────────────────────────────────────────────────────┘
                                 ↓
┌─────────────────────────────────────────────────────────────────┐
│      ESTABLISHING A MAGNETIC COUPLING IN A SECOND ANNULAR SENSOR,│
│  THE SECOND ANNULAR SENSOR COMPRISING A SECOND PLANAR EXCITATION│
│     COIL AND A SECOND PLANAR SENSING COIL PAIR, WHEREIN THE SECOND│ ⟵ 810
│  ANNULAR SENSOR IS POSITIONED TO SURROUND THE FIRST ANNULAR SENSOR│
└─────────────────────────────────────────────────────────────────┘
                                 ↓
┌─────────────────────────────────────────────────────────────────┐
│    POSITIONING A ROTATABLE INDUCTIVE COUPLING ELEMENT (OPT. NON-│
│   FERROMAGNETIC) IN OVERLYING RELATION TO, AND SEPARATED FROM THE│
│   FIRST ANNULAR SENSOR AND THE SECOND ANNULAR SENSOR, THE ROTATABLE│
│     INDUCTIVE COUPLING ELEMENT COMPRISING A FIRST ANNULAR PORTION│
│   COMPRISING AT LEAST ONE ANNULAR CONDUCTIVE SECTOR AND AT LEAST ONE│
│     ANNULAR NON-CONDUCTIVE SECTOR AND A SECOND ANNULAR PORTION  │
│   COMPRISING AT LEAST ONE ANNULAR CONDUCTIVE SECTOR AND AT LEAST ONE│
│      ANNULAR NON-CONDUCTIVE SECTOR, WHEREIN A NUMBER OF ANNULAR │
│    CONDUCTIVE SECTORS OF THE SECOND ANNULAR PORTION IS DIFFERENT│
│     THAN A NUMBER OF ANNULAR CONDUCTIVE SECTORS OF THE FIRST ANNULAR│
│      PORTION (OPT. WHEN THE NUMBER OF ANNULAR CONDUCTIVE SECTORS OF│
│        THE SECOND ANNULAR PORTION IS GREATER THAN THE NUMBER OF │ ⟵ 815
│   CONDUCTIVE SECTORS OF THE FIRST ANNULAR PORTION AND THE NUMBER OF│
│    ANNULAR CONDUCTIVE SECTORS OF THE FIRST ANNULAR PORTION IS GREATER│
│     THAN ONE, THE NUMBER OF ANNULAR CONDUCTIVE SECTORS OF THE SECOND│
│       ANNULAR PORTION IS NOT AN INTEGER MULTIPLE OF THE NUMBER OF│
│    ANNULAR CONDUCTIVE SECTORS OF THE FIRST ANNULAR PORTION OR WHEN│
│     THE NUMBER OF ANNULAR CONDUCTIVE SECTORS OF THE FIRST ANNULAR│
│       PORTION IS GREATER THAN THE NUMBER OF CONDUCTIVE SECTORS OF│
│          THE SECOND ANNULAR PORTION AND THE NUMBER OF ANNULAR   │
│     CONDUCTIVE SECTORS OF THE SECOND ANNULAR PORTION IS GREATER │
│         THAN ONE, THE NUMBER OF ANNULAR CONDUCTIVE SECTORS OF THE│
│      FIRST ANNULAR PORTION IS NOT AN INTEGER MULTIPLE OF THE NUMBER│
│       OF ANNULAR CONDUCTIVE SECTORS OF THE SECOND ANNULAR PORTION│
└─────────────────────────────────────────────────────────────────┘
                                 ↓
                         ( TO 820    )
                         ( FIG. 8B)  )

*FIG. 8A*

HIGH RESOLUTION ANGULAR INDUCTIVE SENSOR AND ASSOCIATED METHOD OF USE

CROSS-REFERENCE TO RELATED APPLICATIONS

The present application claims priority to Indian Provisional Patent Application Serial No. 202021/054,245 filed on Dec. 14, 2020, the contents of which are incorporated by reference herein in their entirety.

BACKGROUND OF THE INVENTION

Numerous industries, including the automotive, industrial and aerospace industries, place stringent reliability requirements on their position sensing systems. Potentiometers are commonly known in the art for use in position sensing systems and are specifically used for determining displacement angles of motor controlled or regulated elements. Although potentiometers are a relatively inexpensive solution for position sensing, they are also susceptible to the effects of adverse environmental conditions and are subject to failure resulting from numerous operations over time. To overcome the disadvantages of potentiometer-based sensing systems, non-contact position sensors are increasingly being used to meet the stringent reliability requirements. Non-contact position sensors are currently known in the art and may be based on various principles, including inductive, capacitive, Hall effect or magneto-resistive principles.

A non-contact sensor based on inductive principles in commonly known as an inductive position sensor, or a resolver. An inductive position sensor comprises a coil assembly having one or more excitation coils and two or more sensing coils. In the operation of an inductive position sensor, an alternating current (AC) is injected into the excitation coil(s) which results in the generation of a time varying magnetic field in the vicinity of the excitation coil. The time varying magnetic field is sufficient to induce a time varying voltage in the sensing coils as a result of the mutual magnetic coupling between the excitation coil and the sensing coils. To determine an angular position of a rotatable target with respect to the coil assembly, a conductive target is rotatably positioned within the time varying magnetic field between the excitation coil and the sensing coils and separated from the coils by a gap. The presence of the rotatable target within the time varying magnetic field changes the mutual magnetic coupling between the excitation coil and the sensing coils, relative to the position of the rotatable target. The change in mutual coupling between the excitation coil and the sensing coils alters the time varying voltage induced in the sensing coils. Since the magnitude of the voltage change induced in the sensing coils is generally sinusoidal with respect to the angular position of the rotatable target relative to the coil assembly, the time varying voltage within the sensing coils can be measured and processed to determine the angular position of the rotatable target.

It is known in the art to form planar coils on one or more printed circuit boards (PCB) to provide the coil assembly of the position sensor. There is large demand for position sensors that are light weight, low cost, highly reliable and with improved noise immunity. While known inductive position sensors meet many of these requirements, various applications also require sensors with high resolution capabilities. For example, in the industrial, medical, space and defense industries, sensor solutions providing high precision and resolution may be required. Additionally, high precision and resolution measurements are often required for antennas communicating with MEO (Medium Earth Orbit) and LEO (Low Earth Orbit) satellites.

Accordingly, what is needed in the art is a non-contact angular position sensor which meets high sensing accuracy and resolution requirements.

SUMMARY OF THE INVENTION

In various embodiments, the present invention provides a system and method for sensing an angular position of a rotatable inductive coupling element with improved accuracy and resolution. The system and method of the present invention provide an improved, non-contact, inductive, angular position sensor which provides for improved accuracy and resolution in the sensor outputs.

In one embodiment, the present invention provides an angular position sensor comprising a first annular sensor and a second annular sensor, the second annular sensor positioned to surround the first annular sensor. The angular position sensor further comprises a rotatable inductive coupling element positioned in overlying relation to and separated from the first annular sensor and the second annular sensor by a gap. The rotatable inductive coupling element further includes a first annular portion comprising at least one annular conductive sector and at least one annular non-conductive sector and a second annular portion comprising at least one annular conductive sector and at least one annular non-conductive sector, and wherein a number of annular conductive sectors of the second annular portion is different than a number of conductive sectors of the first annular portion.

In a particular embodiment, the first planar excitation coil of the angular position sensor forms a circular interior area and a first planar sensing coil pair is positioned within the circular interior area, wherein the first planar sensing coil pair includes a cosine sensing coil and a sine sensing coil and each of the cosine sensing coil and the sine sensing coil respectively include a clockwise winding portion and a counter-clockwise winding portion. Additionally, the second planar excitation coil of the angular position sensor may be positioned to surround the first planar excitation coil and a second planar sensing coil pair may be positioned between the first planar excitation coil and the second planar excitation coil, wherein the second planar sensing coil pair includes a cosine sensing coil and a sine sensing coil and each of the cosine sensing coil and the sine sensing coil comprising a respective clockwise winding portion and a respective counter-clockwise winding portion.

The angular position sensor may additionally include circuitry coupled to the first planar excitation coil, the second planar excitation coil, the first planar sensing coil pair and the second planar sensing coil pair, the circuitry to provide an excitation signal to the first planar excitation coil and the second planar excitation coil to generate an alternating current (AC) magnetic field and to sense modulated sine and cosine waveforms induced in the first planar sensing coil pair and the second planar sensing coil pair in response to a rotation of the rotatable inductive coupling element.

In an additional embodiment, the present invention provides a method for determining an angular position of a rotatable inductive coupling element which includes, establishing a magnetic coupling in a first annular sensor, the first annular sensor comprising a first planar excitation coil and a first planar sensing coil pair positioned within a circular interior area formed by the first planar excitation coil, the first planar sensing coil pair comprising a respective cosine sensing coil and a respective sine sensing coil, each of the respective cosine sensing coil and the respective sine sensing coil of the first planar sensing coil pair comprising a respective clockwise winding portion and a respective counter-clockwise winding portion and establishing a magnetic coupling in a second annular sensor, the second annular sensor comprising a second planar excitation coil and a second planar sensing coil pair positioned with a circular interior area formed by the second planar excitation coil, wherein the second annular sensor is positioned to surround the first annular sensor, the second planar sensing coil pair comprising a respective cosine sensing coil and a respective sine sensing coil, each of the cosine sensing coil and the sine sensing coil of the second planar sensing coil pair comprising a respective clockwise winding portion and a respective counter-clockwise winding portion. The method further includes, positioning a rotatable inductive coupling element in overlying relation to, and separated from the first annular sensor and the second annular sensor, the rotatable inductive coupling element comprising a first annular portion comprising at least one annular conductive sector and at least one annular non-conductive sector and a second annular portion comprising at least one annular conductive sector and at least one annular non-conductive sector, and wherein a number of annular conductive sectors of the second annular portion is different than a number of annular conductive sectors of the first annular portion. The method additionally includes, rotating the rotatable inductive coupling element to generate coarse resolution sine and cosine signals having a number of cycles per rotation of the rotatable inductive coupling element equal to a number of annular conductive sectors of a first one of the first annular portion and the second annular portion of the rotatable inductive coupling element and to generate fine resolution sine and cosine signals having a number of cycles per rotation of the rotatable inductive coupling element equal to a number of annular conductive sectors of a second one of the first annular portion and the second annular portion of the rotatable inductive coupling element and determining an angular position of the rotatable inductive coupling element using the coarse resolution sine and cosine signals and the fine resolution sine and cosine signals.

As such, in various embodiments, the present invention provides an improved non-contact angular position sensor which meets high sensing accuracy and resolution requirements.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description should not be understood as being drawn to scale unless specifically noted.

FIG. 2A is a diagram illustrating a top-down view of an angular position sensor having a 1:6 coarse-to-fine ratio, in accordance with an embodiment of the present invention.

FIG. 8A is a first portion of a flow diagram illustrating method steps for determining an angular position of a rotatable inductive coupling element, in accordance with an embodiment of the present invention.

DETAILED DESCRIPTION OF THE INVENTION

Reference will now be made in detail to various embodiments, examples of which are illustrated in the accompanying drawings. While various embodiments are discussed herein, it will be understood that they are not intended to be limiting. On the contrary, the presented embodiments are intended to cover alternatives, modifications and equivalents, which may be included within the spirit and scope the various embodiments as defined by the appended claims. Furthermore, in this Detailed Description of the Invention, numerous specific details are set forth in order to provide a thorough understanding. However, embodiments may be practiced without one or more of these specific details. In other instances, well known methods, procedures, components, and circuits have not been described in detail so as not to unnecessarily obscure aspects of the described embodiments.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, regions, layer or section discussed below could be termed a second element, component, region, layer or section without departing from the teachings of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
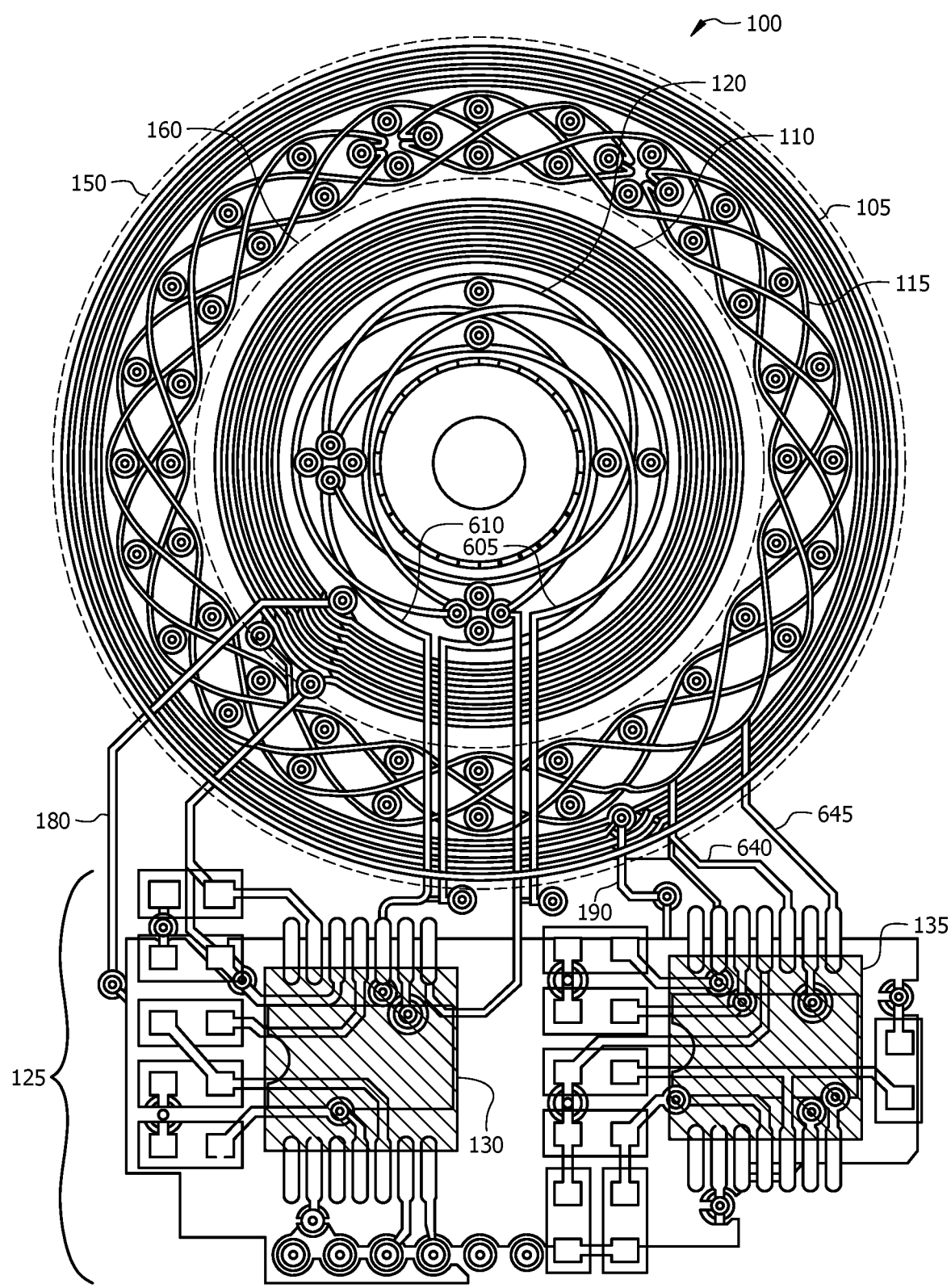
FIG. 1 is a diagram illustrating a coil design of an angular position sensor, in accordance with an embodiment of the present invention.

With reference to FIG. 1, in one embodiment of the present invention, a coil design 100 of an angular position sensor of the present invention comprises two annular sensors 150, 160. Each of the two annular sensors 150, 160 comprises a planar excitation coil and a planar sensing coil. In response to the geometry and positioning of a rotatable inductive coupling element (not shown), one of the two annular sensors 150, 160 provides a coarse angular position measurement signal and the other annular sensor provides a fine angular position measurement signal.

In the embodiment illustrated in FIG. 1, the coil design 100 of the angular position sensor of the present invention includes a first annular sensor 160 comprising a first planar excitation coil 110, forming a circular interior area, and a first planar sensing coil pair 120 positioned within the circular interior area formed by the first planar excitation coil 110. The first planar sensing coil pair 120 includes a sine sensing coil 610 and a cosine sensing coil 605 and each of the sine sensing coil 610 and the cosine sensing coil 605 comprises a clockwise winding portion and a counter-clockwise winding portion. The coil design 100 of the angular position sensor additionally includes a second annular sensor 150 comprising a second planar excitation coil 105, positioned to surround the first planar excitation coil 110 and a second planar sensing coil pair 115 positioned between the first planar excitation coil 110 and the second planar excitation coil 105. The second planar sensing coil pair 115 includes a sine sensing coil 640 and a cosine sensing coil 645 and each of the sine sensing coil 640 and the cosine sensing coil 645 comprising a clockwise winding portion and a counter-clockwise winding portion. In the present invention, a clockwise winding portion is defined as a winding portion wherein the direction of current flow through the winding portion is in a clockwise direction and a counter-clockwise winding portion is defined as a winding portion wherein the direction of current flow through the winding portion is in a counter-clockwise direction when the current through the clockwise winding portion is in the clockwise direction. A voltage input 180 to the first planar excitation coil 110 and a voltage input 190 to the second planar excitation coil 105 establishes the direction of the current flow in the clockwise and counter-clockwise winding portions. Thus, the term clockwise and counter-clockwise, as used throughout, is not meant as a fixed direction, but is rather to establish that the currents at any point in time are flowing in opposite directions.

The above has been described in an embodiment where the planar excitation coils are radially further extended than the planar sensing coils, i.e., each of the excitation coils are distal of the associated sensing coils when viewed from the longitudinal rotation axis, however this is not meant to be limiting in any way. In another embodiment (not shown), the planar sensing coils are radially further extended than the planar excitation coils, i.e., each of the excitation coils are proximal of the associated sensing coils when viewed from the longitudinal rotation axis, which proximal embodiment may require an increase in current for the planar excitation coils as compared with the above distal embodiment.

The coil design 100 of the angular position sensor may additionally include circuitry 125 coupled to the first annular sensor 160 and the second annular sensor 150 of the angular position sensor. The circuitry 125 provides an excitation signal to the planar excitation coils of the first annular sensor 160 and the second annular sensor 150 and receives modulated sine and cosine output signals from the planar sensing coils of the first annular sensor 160 and the second annular sensor 150, in the presence of a rotatable inductive coupling element, commonly referred to as a target. In particular, a first integrated circuit 130 of the circuitry 125 may be coupled to the first planar excitation coil 110 and the first planar sensing coil pair 120 and a second integrated circuit 135 of the circuitry 125 may be coupled to the second planar excitation coil 105 and the second planar sensing coil pair 115. In operation, the first integrated circuit 130 may provide an input voltage to excite the first planar excitation coil 110 at a particular frequency and, in the presence of a rotatable target overlaying the first planar sensing coil pair 120, the first integrated circuit 130 may sense a time varying voltage induced in the first planar sensing coil pair 120, as a modulated sine and cosine output signal. Additionally, the second integrated circuit 135 may provide an input voltage to excite the second planar excitation coil 105 at a particular frequency and, in the presence of a rotatable target overlaying the second planar sensing coil pair 115, the second integrated circuit 135 may sense the modulated sine and cosine output signals induced in the second planar sensing coil pair 115.

FIG. 2A illustrates a top-down view of an angular position sensor 200 having the coil design 100 as shown in FIG. 1 and a rotatable inductive coupling element 250 positioned in overlying relation to, and separated from, the first planar sensing coil pair 120 and the second planar sensing coil pair 115. The rotatable inductive coupling element 250 may be fabricated of a non-ferromagnetic conductive material, including but not limited to, aluminum, brass, copper and stainless steel and other non-ferromagnetic conductive materials known in the art. In general, the rotatable inductive coupling element 250 may be fabricated of any material that is effective in changing the time varying voltage induced in the winding portions of the first planar sensing coil pair 120 and the second planar sensing coil pair 115, when it is placed in the time varying magnetic field in the vicinity of the first and second planar excitation coils 110, 105. The rotatable inductive coupling element 250 is positioned above the first (120) and second (115) planar sensing coil pairs and is separated from the first and second planar sensing coil pairs 120, 115 by a gap.

In the exemplary embodiment of FIG. 2A, the rotatable inductive coupling element 250 includes a first annular portion 290 comprising at least one annular conductive sector 245 and at least one annular non-conductive sector 240. The rotatable inductive coupling element 250 further includes a second annular portion 294 comprising a plurality of annular conductive sectors 220, 222, 224, 226, 228 and 230, connected by an inner annular ring portion 295. Each of the annular conductive sectors 220, 222, 224, 226, 228 and 230 are substantially evenly radially spaced about the second annular portion 294, are connected by inner annular ring portion 295 and extensions thereof are separated by a non-conductive annular sector 202, 204, 206, 208, 210 and 212, respectively.

Figure 2B:
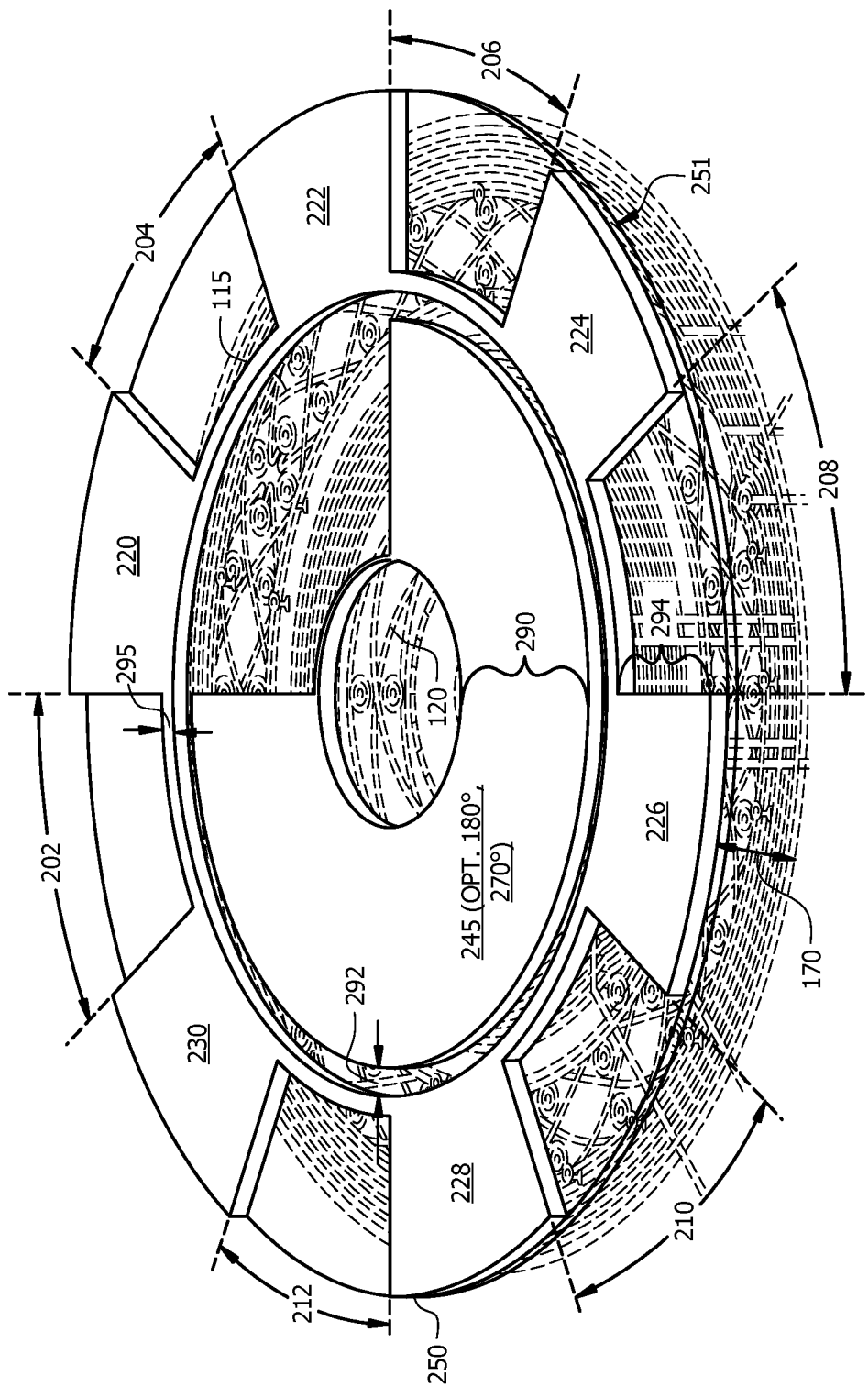
FIG. 2B is a diagram illustrating a perspective view of an angular position sensor having a 1:6 coarse-to-fine ratio, in accordance with an embodiment of the present invention.

FIG. 2B illustrates a perspective view of the angular position sensor of FIG. 2A. As shown in FIG. 2B, the rotatable inductive coupling element 250, comprising a plurality of annular conductive sectors 220, 222, 224, 226, 228 and 230 connected by inner annular ring portion 295, is positioned in overlying relation to, and separated by a gap 170 from, the planar sensing coil pair 115 and annular conductive sector 245 is positioned in overlying relation to, and separated by a gap 170 from, the planar sensing coil pair 120. In particular, the rotatable inductive coupling element 250 is connected to a rotatable shaft (not shown) to position the rotatable inductive coupling element 250 is overlying relation to the first and second planar sensing coil pairs 115, 120. While in the embodiment shown in FIG. 2B, the second annular portion 294 is positioned in overlying relation to the second planar sensing coil pair 115 and the first annular portion 290 is positioned in overlying relation to the first planar sensing coil pair 120, this is not intended to be limiting. Accordingly, it is considered within the scope of the present invention to have the second annular portion 294 positioned in overlying relation to the first planar sensing coil pair 120 and to have the first annular portion 290 positioned in overlying relation to the second planar sensing coil pair 115.

In the exemplary embodiment illustrated in FIG. 2A and FIG. 2B, the annular conductive sectors 220, 222, 224, 226, 228 and 230 of the second annular portion 294 and the annular conductive sector 245 of the first annular portion 290 are a metallic layer fabricated on a dielectric substrate 251. Additionally, the annular non-conductive sectors 202, 204, 206, 208, 210 and 212 of the second annular portion 294 and the annular non-conductive sector 240 of the first annular portion 290 are the dielectric substrate 251 itself, absent the metallic layer. As such, in this view, the coil designs of the annular position sensor 200 are shown as dashed lines because they are not visible below the dielectric substrate 251. Inner annular ring portion 295 allows eddy currents of the annular conductive sectors 220, 222, 224, 226, 228 and 230 of the second annular portion 294 to flow between the annular conductive sectors 220, 222, 224, 226, 228 and 230.

At least two alternative mechanical assembly embodiments are within the scope of the present invention. In the first mechanical assembly embodiment shown in FIG. 2A, the first annular portion 290 and the second annular portion 294 are also separated by a third annular portion 292, which is formed of the dielectric substrate 251. Accordingly, in this embodiment, the first annular portion 290 is separated from the second annular portion 294 by the third annular portion 292, so as not to provide a path for eddy currents to pass between the first annular portion 290 to/from the second annular portion 294. In a second mechanical assembly embodiment (not shown) the annular conductive sectors 220, 222, 224, 226, 228, 230 and 245 of the rotatable inductive coupling element 250 may be a fabricated metallic structure and the annular non-conductive sectors 202, 204, 206, 208, 210, 212 and 240 may be actual voids in the metallic structure, and as such the annular non-conductive sectors 202, 204, 206, 208, 210, 212, 240 may comprise air. In the second mechanical assembly embodiment, the first annular portion 290 and the second annular portion 294 may be continuous thus providing a path for eddy currents to pass between the first annular portion 290 to/from the second annular portion 294. A rotatable inductive coupling element having continuous annular portions will be illustrated and described with reference to FIG. 6.

In the exemplary embodiment of FIG. 2A and FIG. 2B, the first annular portion 290 comprises a single annular conductive sector 245 and the second annular portion 294 comprises six annular conductive sectors 220, 222, 224, 226, 228 and 230. The angle of the annular conductive sector 245 of the first annular portion 290 is 270° and the angle of the non-conductive annular sector 240 of the first annular portion 290 is 90°. However, this is not intended to be limiting and alternatively, the angle of the annular conductive sector 245 could be 180° and the angle of the non-conductive annular sector 240 could also be 180°. Additionally, the angle of each of the six annular conductive sectors 220, 222, 224, 226, 228 and 230 of the second annular portion 294 may optionally be 45° or 30°. Each of the six adjacent annular conductive sectors and annular non-conductive sectors of the second annular portion 294 respectively forms a 60° sensor 280. For example, if the annular conductive sector 222 has an angle of 30°, then the adjacent annular non-conductive sector 204 will have an angle of 30° to establish the 60° sensor 280 and if the annular conductive sector 222 has an angle of 45°, then the adjacent annular non-conductive sector 240 will have an angle of 15° to establish the 60° sensor 280. The angles mentioned above are defined in relation to a central longitudinal axis (not shown) about which rotatable inductive coupling element 250 rotates and are defined as relative arcs of a circular object.

Various other geometric designs of the rotatable inductive coupling element 250 are within the scope of the present invention. For example, the second annular portion 294 may be configured with sensors 280 as a 90° sensor having conductive sectors of 45° or 67.5° and the first annular portion 290 may be configured with a conductive sector of 270° or 180°. In general, the annular conductive sector(s) of either of the annular portions 290, 294 may comprise 50% or 75% of the total annular portion.

When the first annular portion 290 of the rotatable inductive coupling element 250 is positioned in overlying relation to the first planar sensing coil pair 120, and the second annular portion 294 of the rotatable inductive coupling element 250 is positioned in overlying relation to the second planar sensing coil pair 115, a 360° sensor having a 90° non-conductive sector 240 and a 270° conductive sector 245 is established and six 60° sensors 280, each having a respective 30° annular conductive sector 220, 222, 224, 226, 228, 230 and a 30° respective annular non-conductive sector 202, 204, 206, 208, 210, 212 are established. For each rotation of the rotatable inductive coupling element 250, one modulated sine and cosine signal is provided as an output by the first planar sensing coil pair 120 and six modulated sine and cosine signals are provided as an output by the second planar sensing coil pair 115. The modulated sine and cosine signal provided by the rotation of the rotatable inductive coupling element 250 over the first planar sensing coil pair 120 is referred to as the coarse output signal and the modulated sine and cosine signal provided by the rotation of the rotatable inductive coupling element 250 over the second planar sensing coil pair 115 is referred to as the fine output signal. As such, in the embodiment illustrated in FIG. 2A and FIG. 2B, the ratio of coarse output signals to fine output signals is 1:6 and six sine and cosine waveforms are provided by the second annular portion 294 for every one sine and cosine waveform provided by the first annular portion 290 for every complete rotation of the rotatable inductive coupling element 250.

The coarse and fine sine and cosine waveforms are integrated to improve the resolution of the angular position sensor 200. For example, using an analog-to-digital converter (ADC) to sample the integrated waveforms will improve the resolution of the resulting digital example. If the case of the 1:6 coarse to fine ratio output, the resolution is increased by 2.5 bits. It is noted that this ratio is not intended to be limiting and the coarse-to-fine ratio may be based upon custom requirements and may be dependent upon the ADC resolution.

Additionally, while the annular position sensor 200 illustrated in FIGS. 2A and 2B includes only one annular conductive sector 245 in the first annular portion 290, it is not intended to be limiting. The first annular portion 290 may include multiple conductive sectors and the conductive sectors of the second annular portion 294 will be appropriately determined. For example, while the number of conductive sectors of the second annular portion 294 is not limited when the first annular portion 290 comprises only one annular conductive sector, when the first annular portion 290 comprises multiple annular conductive sectors, the number of annular conductive sectors of the second annular portion 294 should preferably not be an integer multiple of the number of annular conductive sectors of the first annular portion 290 to avoid overlapping zero points in the resulting sine and cosine signals that will be difficult to distinguish between when sampling the outputs. For example, if there are 3 annular conductive sectors in the first annular portion 290, the number of annular conductive sectors in the second annular portion 294 should preferably not be an integer multiple of 3.

In operation of the angular position sensor 200, when the rotatable inductive coupling element 250 is positioned within the time varying magnetic field established between the first and second planar excitation coils 110, 105 and the first and second planar sensing coils 120, 115 of the angular position sensor 200, a change in the magnetic field results in the region where the winding portions of the first and second planar sensing coils 120, 115 are covered by the annular conductive sectors 220, 222, 224, 226, 228, 230, 245 of the rotatable inductive coupling element 250. Positioning the rotatable inductive coupling element 250 within the magnetic field induces eddy currents in the rotatable inductive coupling element 250 which dampens the time varying magnetic field in the region of the winding portions of the first and second planar sensing coils 120, 115 covered by the annular conductive sectors 220, 222, 224, 226, 228, 230, 245 of the rotatable inductive coupling element 250. As a result of the induction of eddy currents in the annular conductive sectors 220, 222, 224, 226, 228, 230, 245 of the rotatable inductive coupling element 250, the time varying voltage induced in the windings portions of the first and second planar sensing coils 120, 115 covered by the annular conductive sectors 220, 222, 224, 226, 228, 230, 245 of the rotatable inductive coupling element 250 are attenuated and the time varying voltage induced in the winding portions of the first and second planar sensing coils 120, 115 that are not covered by the annular conductive sectors 220, 222, 224, 226, 228, 230, 245 of the rotatable inductive coupling element 350, i.e. those covered by one of the annular non-conductive sectors 202, 204, 206, 208, 210, 212, 240 are not attenuated.

Figure 3A:
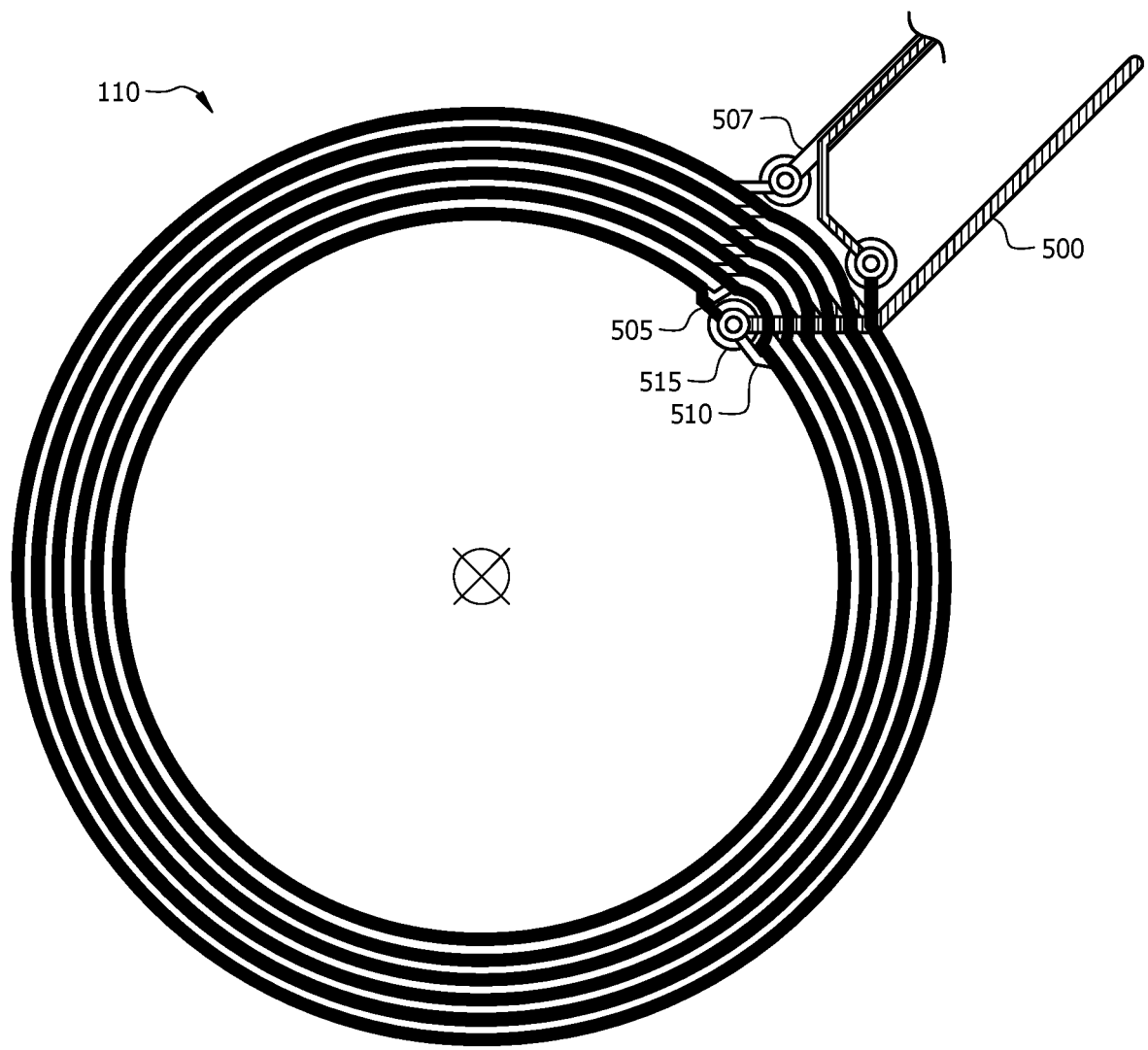
FIG. 3A is a detailed view of a planar excitation coil of the first annular sensor of the angular position sensor, in accordance with an embodiment of the present invention.
Figure 3B:
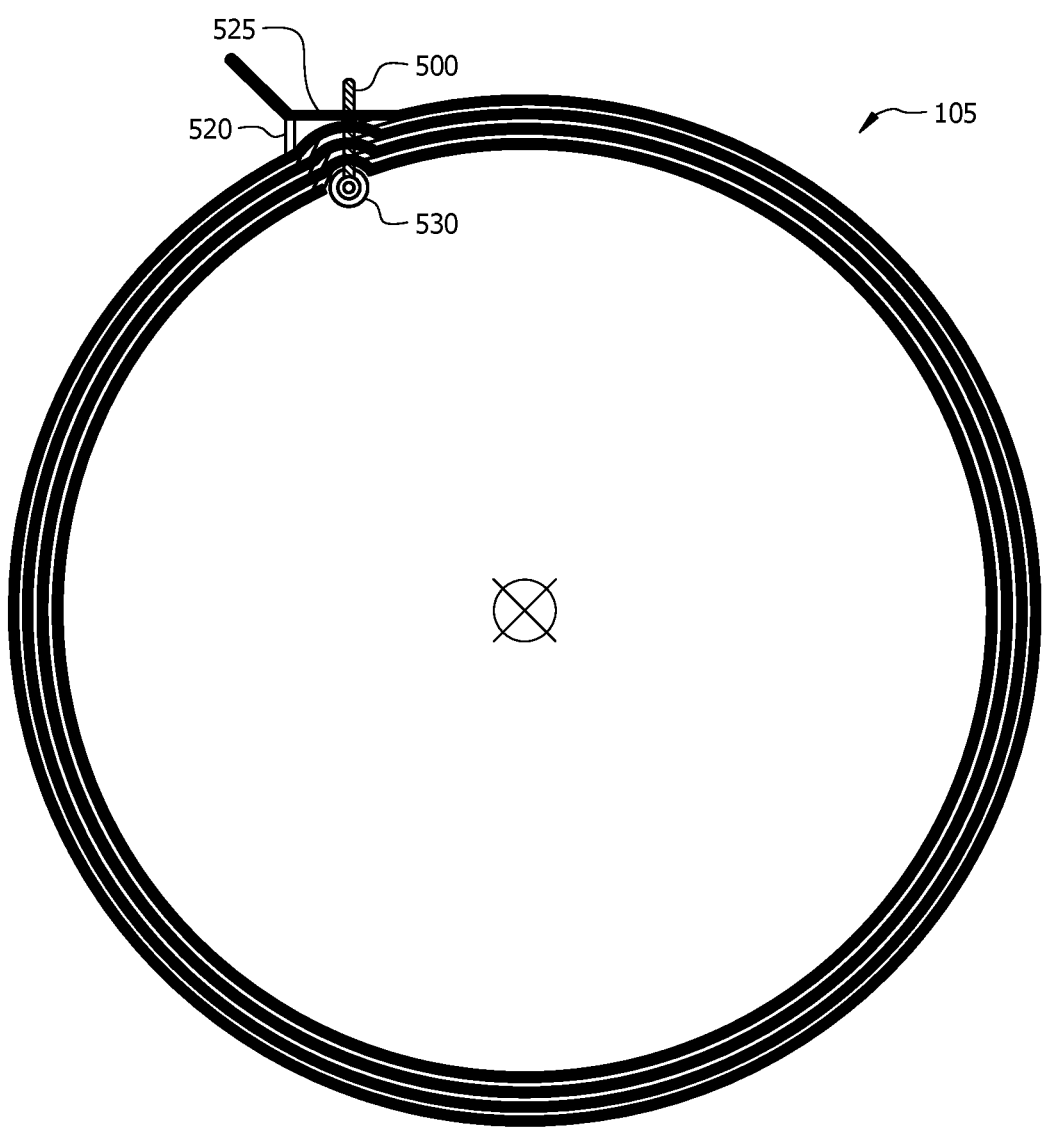
FIG. 3B is a detailed view of a planar excitation coil of the second annular sensor of the angular position sensor, in accordance with an embodiment of the present invention.

Detailed views of the first planar excitation coil 110 and the second planar excitation 105 are shown with reference to FIG. 3A and FIG. 3B, respectively. In various embodiments, the planar excitation coils 105, 110 of the coil design 100 of the angular position sensor 200 of the present invention may be implemented on a multilayer substrate, such as a printed circuit board (PCB). Etching of printed circuit boards is commonly known in the art to form conductive traces having desired patterns on either single layer or multilayer substrates.

In the illustrated embodiment of FIG. 3A, the first planar excitation coil 110 may include one or more winding turns and the winding turns of the first planar excitation coil 110 may be positioned on a first layer and on a second layer of a PCB substrate, wherein the first layer and the second layer of the PCB substrate are connected by a via 515, as is commonly known in the art. In the illustrated embodiment, the portion of the first planar excitation coil 110 that is illustrated in black is assumed to be positioned on the first layer of the PCB structure and the portion of the first planar excitation coil 110 that is illustrated in white is assumed to be positioned on the second layer of the PCB substrate. As such, the first planar excitation coil 110 may include a counter-clockwise winding portion 505 on a first layer of the PCB substrate and a clockwise winding portion 510 on the second layer of the PCB substrate. In operation, a voltage is provided by the first integrated circuit 130 at an input voltage 500 to the first planar excitation coil 110 to excite the first planar excitation coil 110 at a desired frequency. In operation, a voltage, relative to ground 507 is provided to the first planar excitation coil 110 by the first integrated circuit 130 at the common input 500 to the first planar excitation coil 110 to excite the first planar excitation coil 110 at a desired frequency.

In the illustrated embodiment of FIG. 3B, the second planar excitation coil 105 may include one or more winding turns and the winding turns of the second planar excitation coil 105 may be positioned on a first layer and on a second layer of a PCB substrate, wherein the first layer and the second layer of the PCB substrate are connected by a via 530, as is commonly known in the art. In the illustrated embodiment, the portion of the second planar excitation coil 105 that is illustrated in black is assumed to be positioned on the first layer of the PCB structure and the portion of the second planar excitation coil 105 that is illustrated in white is assumed to be positioned on the second layer of the PCB substrate. The second planar excitation coil 105 may include a counter-clockwise winding portion 525 on a first layer of the PCB substrate and a clockwise winding portion 520 on the second layer of the PCB substrate. In operation, a voltage is provided by the second integrated circuit 135 at the common input 500 to the second planar excitation coil 105 to excite the second planar excitation coil 105 at a desired frequency.

Detailed views of the first planar sensing coil pair 120 and the second planar sensing coil pair 115 are illustrated with reference to FIG. 4A and FIG. 4B, respectively. In various embodiments, the planar sensing coil pairs 115, 120 of the coil design 100 of the angular position sensor 200 of the present invention may be implemented on a multilayer substrate, such as a printed circuit board (PCB). Etching of printed circuit boards is commonly known in the art to form conductive traces having desired patterns on either single layer or multilayer substrates.

Figure 4A:
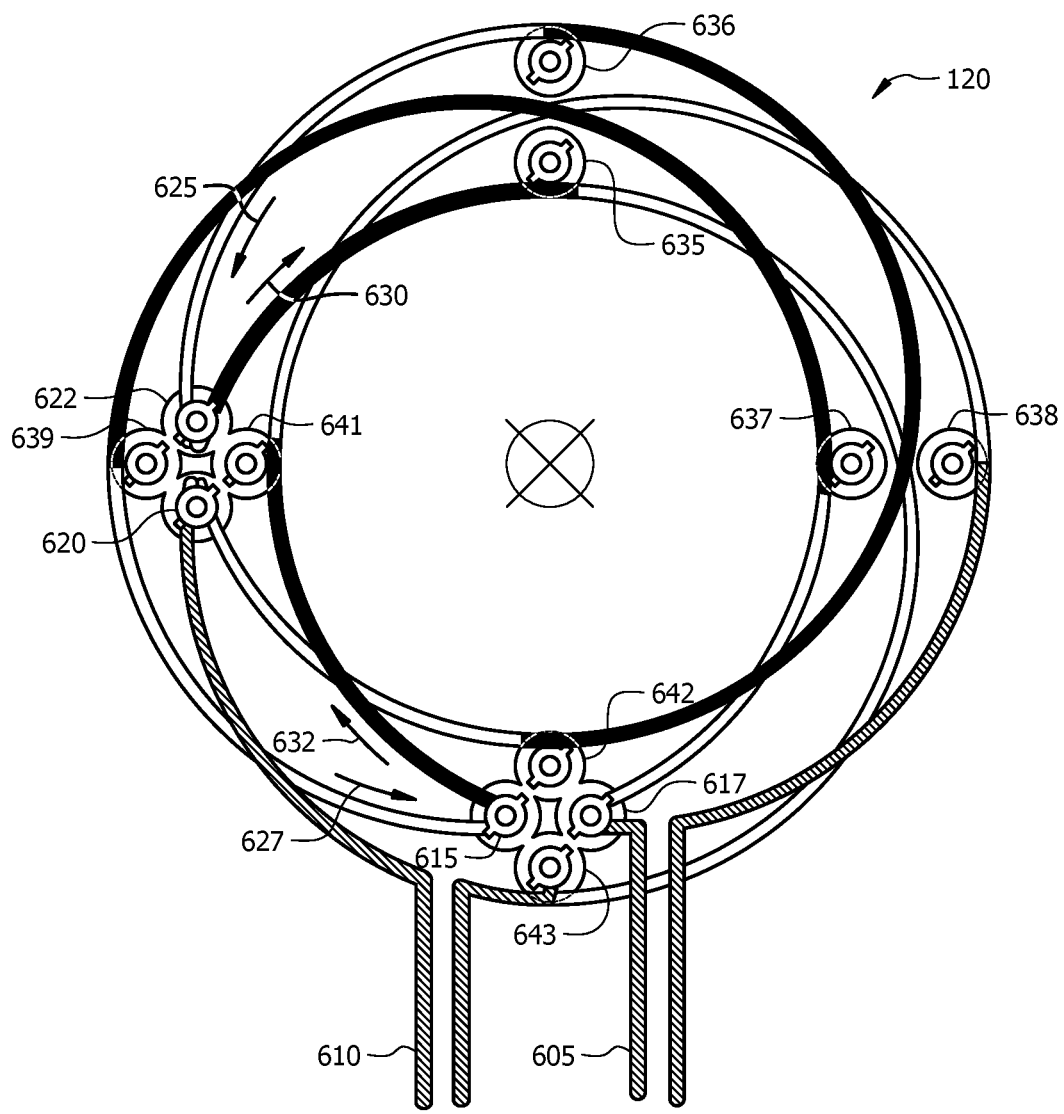
FIG. 4A is a detailed view of a pair of planar sensing coils of the first annular sensor of the angular position sensor, in accordance with an embodiment of the present invention.

In the illustrated embodiment of FIG. 4A, the first planar sensing coil pair 120 includes a sine sensing coil 610 and a cosine sensing coil 605 and each of the sine sensing coil 610 and the cosine sensing coil 605 may include one or more winding turns. The winding turns of the sine sensing coil 610 coil pair 120 may be positioned on a first layer and on a second layer of a PCB substrate, wherein the first layer and the second layer are connected by one or more vias 620, 622, 635, 636, 642, 643 and the cosine sensing coil 605 may be positioned on the first layer and on the second layer of the PCB substrate, wherein the first layer and the second layer are connected by one or more vias 615, 617, 637, 638, 639, 641, as is commonly known in the art. In the illustrated embodiment, the portion of the sine sensing coil 610 and the cosine sensing coil 605 illustrated in black is assumed to be positioned on the first layer of the PCB structure and the portion illustrated in white is assumed to be positioned on the second layer of the PCB substrate. Each of the sine sensing coil 610 and the cosine sensing coil 605 of coil pair 120 includes a counter-clockwise winding portion and a clockwise winding portion. The direction of the current along the signal path in the sine sensing coil 610 changes at cross-over vias 620, 622. For example, the direction of the current in the sine sensing coil 610 changes from counter-clockwise 625 to clockwise 630 at cross-over via 622. Additionally, the direction of current along the single path in the cosine sensing coil 605 changes at cross-over vias 615, 617. For example, the direction of the current in the cosine sensing coil 605 changes from counter-clockwise 627 to clockwise 632 at cross-over via 615. In operation, a time varying voltage is induced in the first planar sensing coil pair 120 in response to the time varying magnetic field established in the vicinity of the first planar sensing coil pair 120 by the first planar excitation coil 110 and the position of the rotatable inductive coupling element 250. The first planar sensing coil pair 120 provides a modulated sine signal as an output from the sine sensing coil 610 and a modulated cosine signal as an output from the cosine sensing coil 605. The modulated sine signal and the modulated cosine signal generated by the first planar sensing coil pair 120 are sensed by the first integrated circuit 130, shown in FIG. 1. In this embodiment, the modulated signals provided by the first planar sensing coil pair 120 are considered the coarse signals for determining the angular position of the rotatable inductive coupling element 250.

Figure 4B:
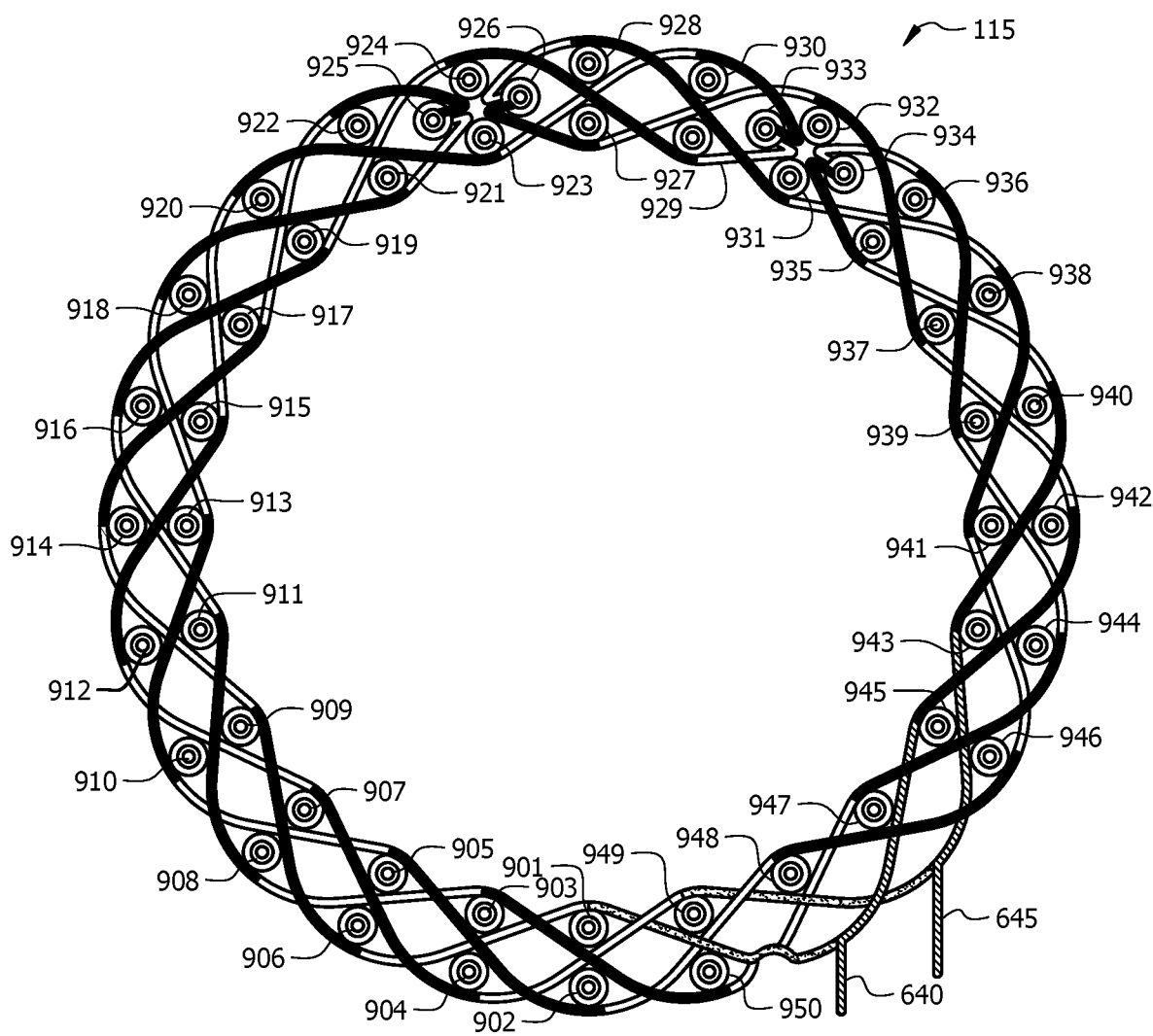
FIG. 4B is a detailed view of a pair of planar sensing coils of the second annular sensor of the angular position sensor, in accordance with an embodiment of the present invention.

In the illustrated embodiment of FIG. 4B, the second planar sensing coil pair 115 includes a sine sensing coil 640 and a cosine sensing coil 645 and each of the sine sensing coil 640 and the cosine sensing coil 645 may include one or more winding turns. The winding turns of the sine sensing coil 640 may be positioned on a first layer and on a second layer of a PCB substrate, wherein the winding turns are connected by one or more vias 901, 902, 905, 906, 909, 910, 913, 914, 917, 918, 921, 922, 925, 926, 927, 928, 931, 932, 937, 938, 941, 942, 945, 946, 948 and the cosine sensing coil 645 may be positioned on the first layer and on the second layer of the PCB substrate, wherein the first layer and the second layer are connected by one or more via 903, 904, 907, 908, 911, 912, 915, 916, 919, 920, 923, 924, 929, 930, 933, 934, 935, 936, 939, 940, 943, 944, 947, 949, 950, as is commonly known in the art. In the illustrated embodiment, the portion of the sine sensing coil 640 and the cosine sensing coil 645 illustrated in black is assumed to be positioned on the first layer of the PCB structure and the portion illustrated in white is assumed to be positioned on the second layer of the PCB substrate. Each of the sine sensing coil 640 and the cosine sensing coil 640 includes a counter-clockwise winding portion and a clockwise winding portion. The direction of the current along the signal path in the sine sensing coil 640 changes at cross-over vias 925, 926. For example, the direction of the current in the sine sensing coil 640 changes from clockwise to counter-clockwise at cross-over via 925 and changes from counter-clockwise to clockwise at cross-over via 926. Additionally, the direction of current along the single path in the cosine sensing coil 645 changes at cross-over vias 933, 934. For example, the direction of the current in the cosine sensing coil 645 changes from counter-clockwise to clockwise at cross-over via 934 and changes from clockwise to counter-clockwise at cross-over via 933. coil pair 115 In operation, a time vary voltage is induced in the second planar sensing coil pair 115 in response to the time varying magnetic field established in the vicinity of the second planar sensing coil pair 115 by the second excitation coil 105 and the position of the rotatable inductive coupling element 250. The second planar sensing coil pair 115 provides a modulated sine signal at a first output 640 and a modulated cosine signal at a second output 645. The modulated sine signal and the modulated cosine signal generated by the second planar sensing coil pair 115 are sensed by the second integrated circuit 135, shown in FIG. 1. In this embodiment, the modulated signals provided by the second planar sensing coil pair 115 are considered the fine signals for determining the angular position of the rotatable inductive coupling element 250.

Figure 5:
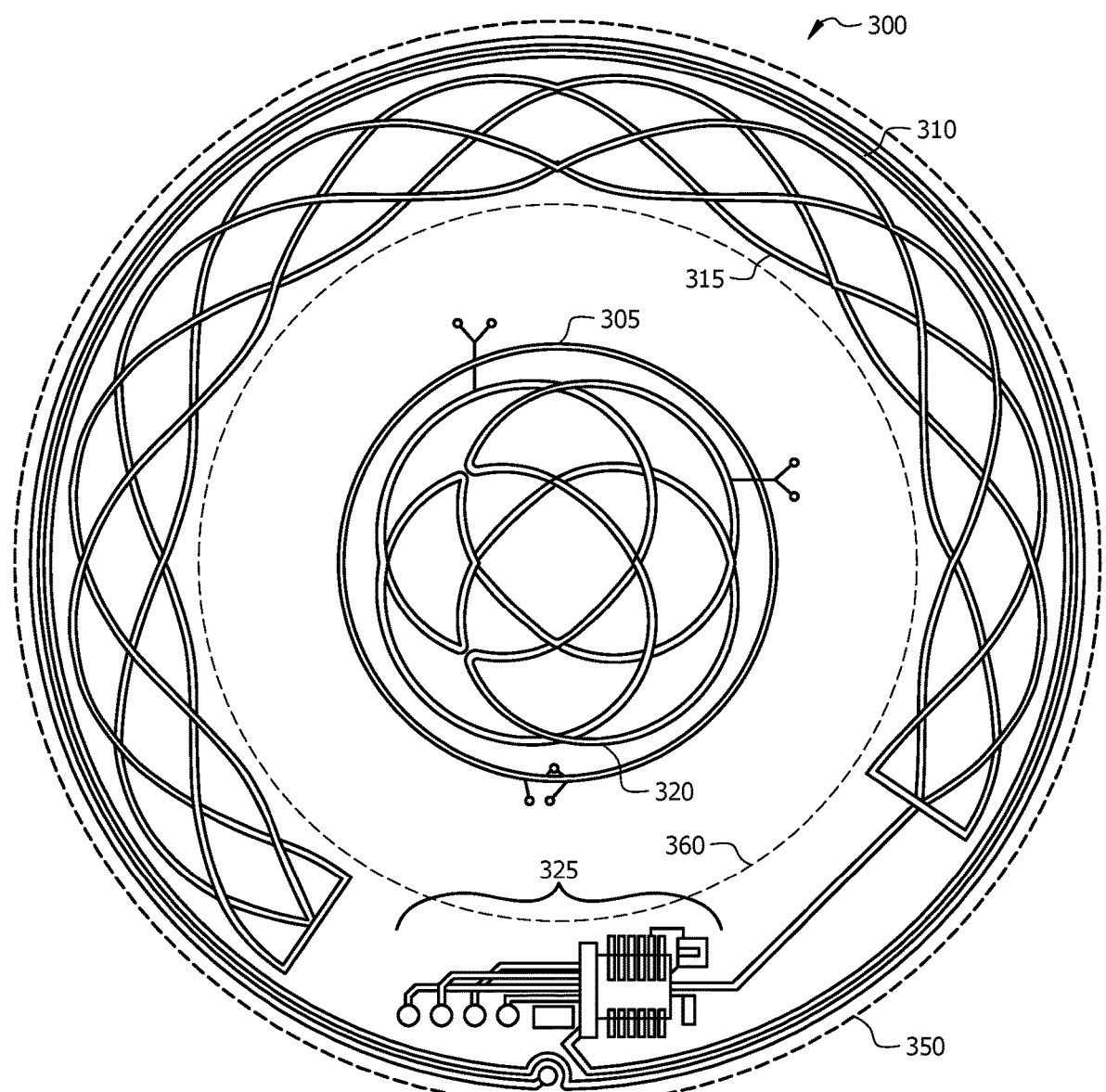
FIG. 5 is a diagram illustrating an alternative coil design of an angular position sensor, in accordance with an embodiment of the present invention.

FIG. 5 illustrates another exemplary embodiment of a coil design 300 of an angular position sensor, in accordance with the present invention. In the previous embodiment illustrated in FIG. 2A and FIG. 2B, the layout of the excitation coils 105, 110, the sensor coils 115, 120 and the apertures 202, 204, 206, 208, 210, 212 of the rotatable inductive coupling element 250 were designed to establish a 60° sensor. In the embodiment of FIG. 5, the layout of the excitation coils 305, 310, the sensor coils 315, 320 and the apertures 302, 304, 306, 308 of the rotatable inductive coupling element 390 (shown in FIG. 6) are designed to establish a 90° sensor. As shown in FIG. 5 the coil design 300 comprises two annular sensors 350, 360. Each of the two annular sensors 350, 360 comprises a planar excitation coil and a planar sensing coil. In response to the geometry and positioning of the rotatable inductive coupling element, one of the two annular sensors 350, 360 provides a course angular position measurement signal and the other annular sensor provides a fine angular position measurement signal.

In the embodiment illustrated in FIG. 5, the coil design 300 of the angular position sensor of the present invention includes a first annular sensor 360 comprising a first planar excitation coil 310, forming a circular interior area, and a first planar sensing coil pair 320 positioned within the circular interior area formed by the first planar excitation coil 310. Each planar sensing coil of the first planar sensing coil pair 320 includes a clockwise winding portion and a counter-clockwise winding portion. The coil design 300 of the angular position sensor additionally includes a second annular sensor 350 comprising a second planar excitation coil 305, positioned to surround the first planar excitation coil 310 and a second planar sensing coil pair 315 positioned between the first planar excitation coil 310 and the second planar excitation coil 305. Each planar sensing coil of the second planar sensing coil pair 315 includes a clockwise winding portion and a counter-clockwise winding portion.

The coil design 300 of the angular position sensor may additionally include circuitry 325 coupled to the first annular sensor 360 and the second annular sensor 350 of the angular position sensor. The circuitry 325 provides an excitation signal to the first planar excitation coil 310 of the first annular sensor 360 and to the second planar excitation 305 of the second annular sensor 350 and receives modulated sine and cosine output signals from the first planar sensing coil pair 320 of the first annular sensor 360 and from the second planar sensing coil pair 315 of the second annular sensor 350, in the presence of a rotatable inductive coupling element, commonly referred to as a target. The circuitry 325 provides an input voltage to excite the first planar sensing coil 310 at a first particular frequency and in the presence of the rotatable inductive coupling element overlaying the first planar sensing coil pair 320, the circuitry 325 may sense a time varying voltage induced in the first planar sensing coil pair 320, as a modulated sine and cosine output signal. Additionally, the circuitry 325 provides an input voltage to excite the second planar excitation coil 305 at a second particular frequency and, in the presence of a rotatable target overlaying the second planar sensing coil pair 315, the circuitry 125 may sense the modulated sine and cosine output signals induced in the second planar sensing coil pair 315.

Figure 6A:
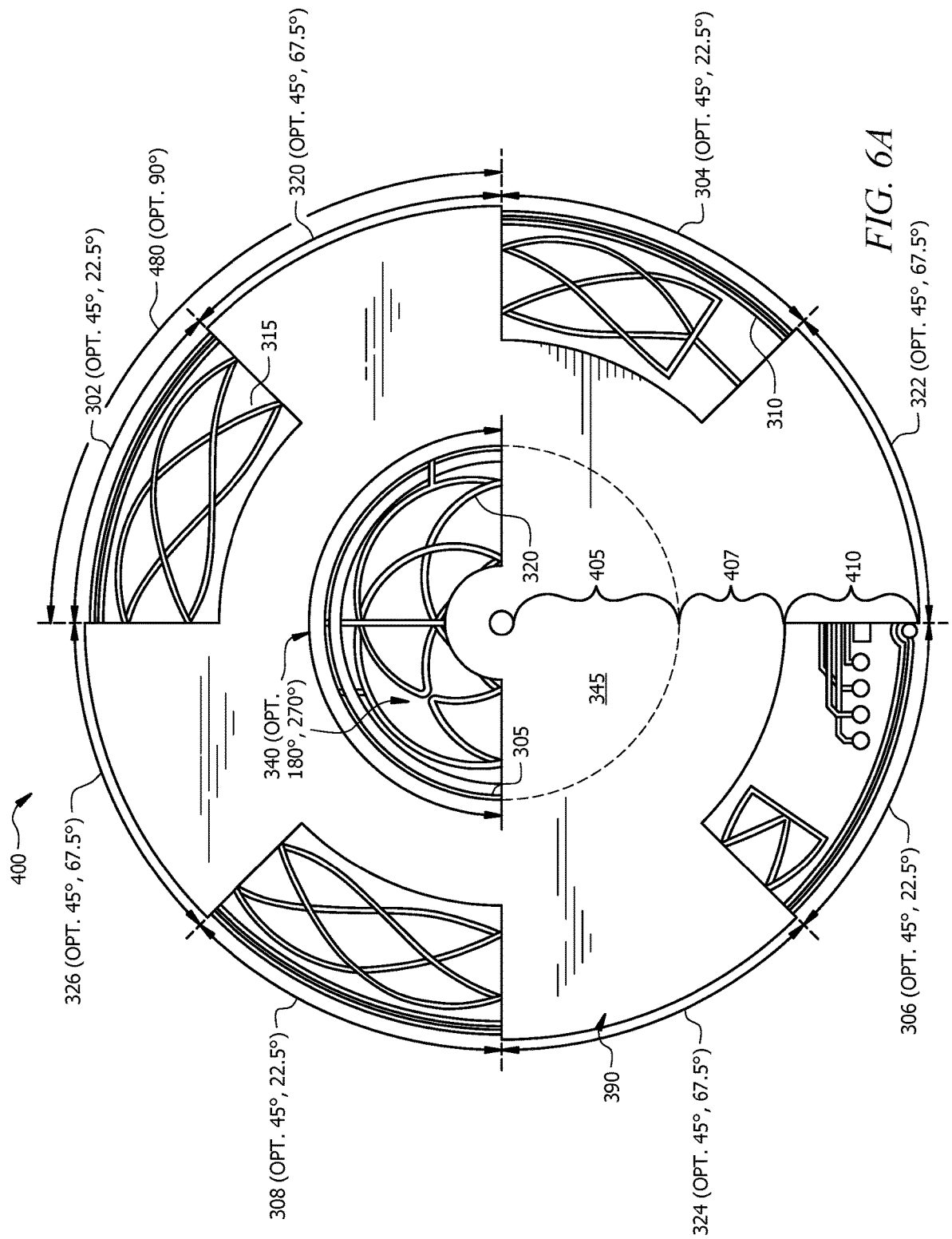
FIG. 6A is a diagram illustrating an angular position sensor having a 1:4 coarse-to-fine ratio, in accordance with an embodiment of the present invention.

An exemplary annular position sensor 400 is illustrated in FIG. 6A, including the coil design 300 illustrated in FIG. 5 and the rotatable inductive coupling element 390 positioned in overlying relation to, and separated from, the first planar sensing coil pair 320 and the second planar sensing coil pair 315. The rotatable inductive coupling element 390 may be fabricated of a non-ferromagnetic conductive material, including but not limited to, aluminum, brass, copper and stainless steel and other non-ferromagnetic conductive materials known in the art. In general, the rotatable inductive coupling element 390 may be fabricated of any material that is effective in changing the time varying voltage induced in the winding portions of the first and second planar sensing coil pairs 320, 315 when it is placed in the time varying magnetic field in the vicinity of the first and second planar excitation coils 310, 305. The rotatable inductive coupling element 390 is positioned above the first (320) and second (315) planar sensing coil pairs and is separated from the first and second planar sensing coil pairs 320, 315 by a gap.

In the exemplary embodiment of FIG. 6A, the rotatable inductive coupling element 390 includes a first annular portion 405 comprising at least one annular conductive sector 345 and at least one annular non-conductive sector 340. The rotatable inductive coupling element 390 further includes a second annular portion 410 comprising a plurality of annular conductive sectors 320, 322, 324 and 326. The first annular portion 405 and the second annular portion 410 are connected by a third annular portion 407. The third annular portion 407 is comprised of a 360° conductive ring connecting the annular conductive sector 345 of the first annular portion 405 to the plurality of annular conductive sectors 320, 322, 324, 326 of the second annular portion 410 thus providing a path for eddy currents to pass between the first annular portion 405 to/from the second annular portion 410. Each of the annular conductive sectors 320, 322, 324 and 326 are substantially evenly spaced about the second annular portion 410 and are separated by a respective annular non-conductive sector 302, 304, 306 and 308, respectively, that is the radial section of each of the conductive sectors 320, 322, 324 and 326 are substantially equal, and the angular separation between each of the conductive sectors 320, 322, 324 and 326 are substantially equal. While in the embodiment shown in FIG. 6A, the second annular portion 410 is positioned in overlying relation to the second planar sensing coil pair 315 and the first annular portion 405 is positioned in overlying relation to the first planar sensing coil pair 320, this is not intended to be limiting. Accordingly, it is considered within the scope of the present invention to have the second annular portion 410 positioned in overlying relation to the first planar sensing coil pair 320 and to have the first annular portion 405 positioned in overlying relation to the second planar sensing coil pair 315.

In the exemplary embodiment illustrated in FIG. 6A, the annular conductive sectors 320, 322, 324 and 326 of the second annular portion 410 and the annular conductive sector 345 of the first annular portion 405 are comprised of a non-ferromagnetic conductive material. Additionally, the annular non-conductive sectors 302, 304, 306 and 308 of the second annular portion 410 and the annular non-conductive sector 340 of the first annular portion 405 are voids in the non-ferromagnetic conductive material.

In the exemplary embodiment, the first annular portion 405 of the annular position sensor 400 comprises a single annular conductive sector 345 extending radially from a longitudinal axis of rotation of the rotatable inductive coupling element 350 to the beginning of third annular portion 407, the third annular portion 407 extends to the beginning of the second annular portion 410 and the second annular portion 410 of the annular position sensor 400 comprises four annular conductive sectors 320, 322, 324 and 326. The angle of the annular conductive sector 345 of the first annular portion 405 is 180° and the angle of the annular non-conductive sector 340 of the first annular portion 405 is 180°. Additionally, the angle of each of the four annular conductive sectors 320, 322, 324 and 326 of the second annular portion 410 may optionally be 45° or 67.5°. Each of the four adjacent annular conductive sectors and annular non-conductive sectors of the second annular portion 410 forms a 90° sensor 480. For example, if the annular conductive sector 320 has an angle of 45°, then the adjacent annular non-conductive sector 302 will have an angle of 45° to establish the 90° sensor 480 and if the annular conductive sector 320 has an angle of 67.5°, then the adjacent annular non-conductive sector 302 will have an angle of 22.5° to establish the 90° sensor 480. The angles 45° or 67.5° are not meant to be limiting in any way, and other combinations may be utilized without exceeding the scope.

When the first annular portion 405 of the rotatable inductive coupling element 350 is positioned in overlying relation to the first planar sensing coil pair 320, and the second annular portion 410 of the rotatable inductive coupling element 350 is positioned in overlying relation to the second planar sensing coil pair 315, a 360° sensor having a 180° annular conductive sector 345 and a 180° annular non-conductive sector 340 is established and four 90° sensors 480, each having a 45° annular conductive sector 320 and a 45° annular non-conductive sector 302, or each having a 67.5° annular conductive sector 320 and a 22.5° annular non-conductive sector 302 are established. For each rotation of the rotatable inductive coupling element 350, one modulated sine and cosine signal is provided as an output by the first planar sensing coil pair 320 and four modulated sine and cosine signals are provided as an output by the second planar sensing coil pair 315. The modulated sine and cosine signal provided by the rotation of the rotatable inductive coupling element 350 over the first planar sensing coil pair 320 is referred to as the coarse output signal and the modulated sine and cosine signals provided by the rotation of the rotatable inductive coupling element 350 over the second planar sensing coil pair 315 are referred to as the fine output signals. As such, in the embodiment illustrated in FIG. 6A, the ratio of coarse output signals to fine output signals is 1:4 and four sine and cosine waveforms are provided by the second annular portion 410 for every one sine and cosine waveform provided by the first annular portion 405, for every complete rotation of the rotatable inductive coupling element 350.

The coarse and fine sine and cosine waveforms are integrated to improve the resolution of the angular position sensor 400. For example, using an analog-to-digital converter (ADC) to sample the integrated waveforms will improve the resolution of the resulting digital example. If the case of the 1:4 coarse to fine ratio output, the resolution is increased by 2 bits. It is noted that this ratio is not intended to be limiting and the coarse-to-fine ratio may be based upon custom requirements.

Additionally, while the annular position sensor 400 illustrated in FIG. 6A includes only one annular conductive sector 345 in the first annular portion 405 of the rotatable inductive coupling element 390, it is not intended to be limiting. The first annular portion 405 may include multiple annular conductive sectors and the conductive sectors of the second annular portion 410 will be appropriately determined. For example, while the number of annular conductive sectors of the second annular portion 410 is not limited when the first annular portion 405 comprises only one annular conductive sector, when the first annular portion 405 comprises annular multiple conductive sectors, the number of annular conductive sectors of the second annular portion 410 preferably should not be an integer multiple of the number of annular conductive sectors of the first annular portion 410 to avoid overlapping zero points in the resulting sine and cosine signals that will be difficult to distinguish between when sampling the outputs. For example, if there are 2 conductive portions in the first annular portion 405, the number of conductive portions in the second annular portion 410 should preferably not be an integer multiple of 2.

In operation of the angular position sensor 400, when the rotatable inductive coupling element 390 is positioned within the time varying magnetic field established between the first and second planar excitation coils 310, 305 and the first and second planar sensing coils 320, 315 of the angular position sensor 400, a change in the magnetic field results in the region where the winding portions of first and second planar sensing coils 320, 315 are covered by the respective annular conductive portions 320, 322, 324, 326 of the rotatable inductive coupling element 390. Positioning the rotatable inductive coupling element 390 within the magnetic field induces eddy currents in the rotatable inductive coupling element 390 which dampens the time varying magnetic field in the region of the winding portions of the first and second planar sensing coils 320, 315 covered by the annular conductive portions 320, 322, 324, 326, 345 of the rotatable inductive coupling element 350. As a result of the induction of eddy currents in the annular conductive portions 320, 322, 324, 326, 345 of the rotatable inductive coupling element 390, the time varying voltage induced in the windings portions of the first and second planar sensing coils 320, 315 covered by the annular conductive portions 320, 322, 324, 326, 345 of the rotatable inductive coupling element 390 are attenuated and the time varying voltage induced in the winding portions of the first and second planar sensing coils 320, 315 that are not covered by the annular conductive portions 320, 322, 324, 326, 345 of the rotatable inductive coupling element 390, i.e. those covered by one of the annular non-conductive portions 302, 304, 306, 308 and 340 are not attenuated. As indicated above, the third annular portion 407 connects the annular conductive sector 345 of the first annular portion 405 to the plurality of annular conductive sectors 320, 322, 324, 326 of the second annular portion 410 thus providing a path for eddy currents to pass between the first annular portion 405 to/from the second annular portion 410, however there is no appreciable crosstalk between the coarse sensor comprising first annular portion 405 overlying the first planar sensing coil pair 320 and the fine sensor comprising second annular portion 410 overlying the second planar sensing coil pair 315 because of the electrical isolation between first planar sensing coil pair 320 and second planar sensing coil pair 315.

Figure 6B:
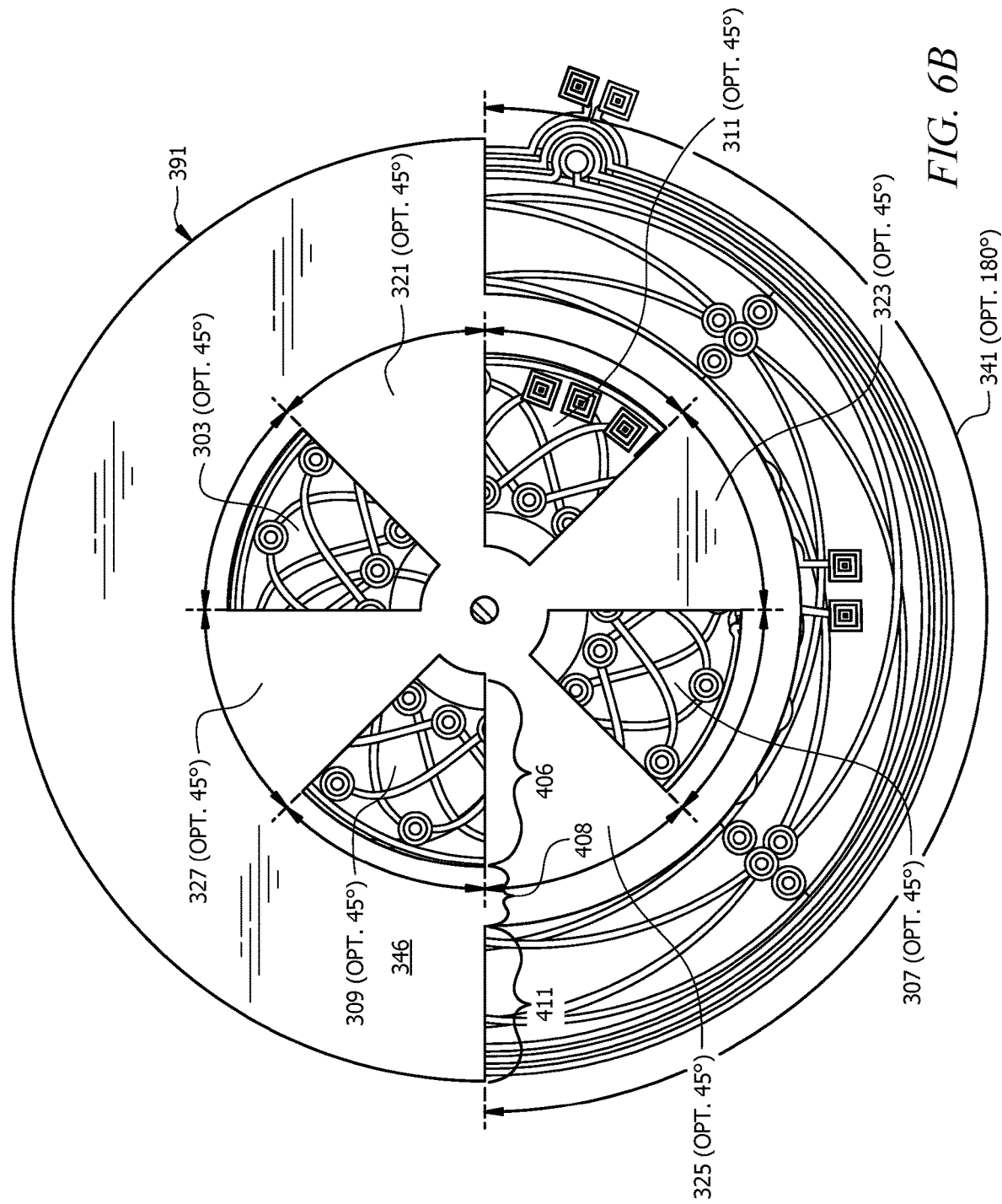
FIG. 6B is a diagram illustrating an alternative embodiment of a rotatable inductive coupling element providing a 1:4 coarse-to-file ratio.

In an alternative embodiment shown in in FIG. 6B, a first annular portion 406 of a rotatable inductive coupling element 391 may include multiple annular conductive sectors 321, 323, 325, 327 and separated by annular non-conductive sectors 303, 307, 309, 311 and a second annular portion 411 may include only one annular conductive sector 346. The conductive sectors 321, 323, 325, 327 of the first annular portion 406 and the conductive sector 346 of the second annular portion 411 are connected by a third annular portion 408, that is also conductive. In particular, each of the annular conductive sectors 321, 323, 325, 327 of the first annular portion 406 of the rotatable inductive coupling element 391 may have an angle of 45° and the annular conductive sector 346 of the second annular portion 411 may have an angle of 180°. The sensing coil pairs underly the first annular portion 406 and the second annular portion 411. The third annular portion 408 connects the conduction portions 321, 323, 325, 327 of first annular portion 406 to each other and to conductive sector 346 of the second annular portion 411 thus providing a path for eddy currents. However, there is no appreciable crosstalk between the coarse sensor comprising second annular portion 411 overlying the respective sensing coil pair and the fine sensor comprising first annular portion 406 overlying the respective planar sensing coil pair because of the electrical isolation between planar sensing coil pairs.

Figure 7:
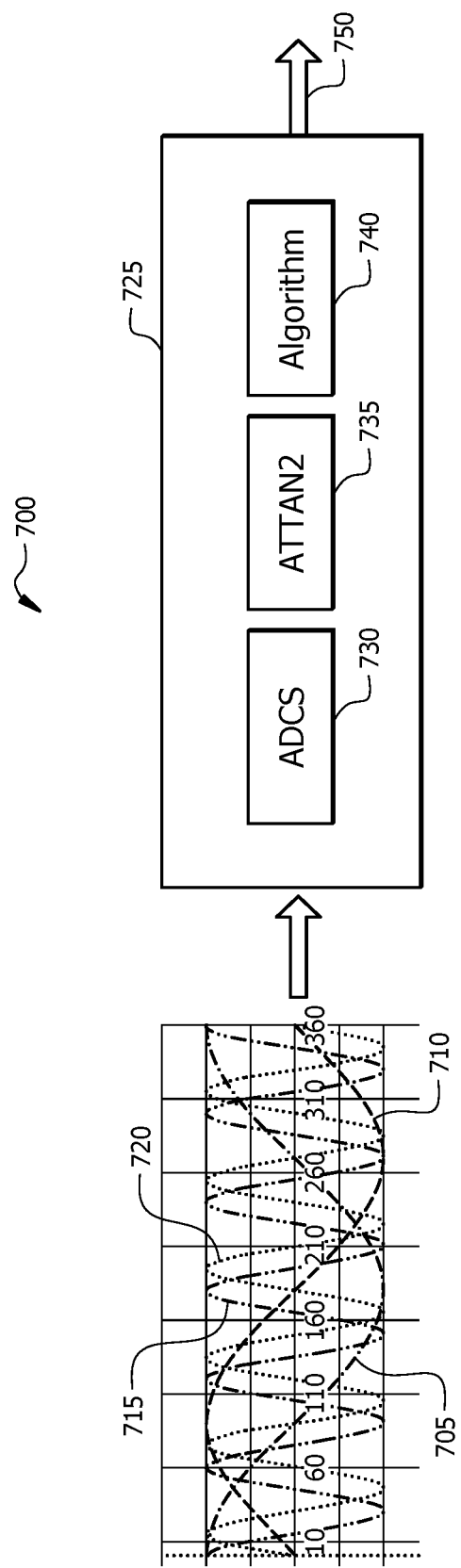
FIG. 7 is a block diagram illustrating exemplary processing steps of analog signals from the annular position sensor to determine an angular position of a rotatable inductive coupling element, in accordance with an embodiment of the present invention.

FIG. 7 illustrates a system 700 for processing the output signals of the angular position sensor 200 illustrated in FIG. 1 and FIG. 2, where the x-axis represents degrees of rotation of the rotatable inductive coupling element 250 and the y-axis represents amplitude of the received respective signal. As shown, the first annular sensor 160 of the angular position sensor 200 generates one cycle of sine 705 and cosine 710 signals during one rotation of the rotatable inductive coupling element 250. Additionally, the second annular sensor 150 of the angular position sensor 200 generates six cycles of sine 715 and cosine 720 signals during one rotation of the rotatable inductive coupling element 250. The signals from the first annular sensor 160 are used to resolve the coarse position of the rotatable inductive coupling element 250 and the signals from the second annular sensor 150 are used to resolve the fine position of the rotatable inductive coupling element 250. The sine 705 and cosine 710 signal from the first annular sensor 160 and the sine 715 and cosine 720 signals from the second annular sensor 150 and are provided to a microprocessor 725. The microprocessor 725 may include analog to digital converters (ADCS) 730 for converting the analog sine and cosine signals to digital signals. The microprocessor may further include (ATTAN2) circuitry 735 for taking the arc tangent of the digital sine 705 and cosine 710 signals from the first annular sensor 160 to calculate the coarse position of the rotatable inductive coupling element 250 and for taking the arc tangent of the digital sine 715 and cosine 720 signals from the second annular sensor 150 to calculate the fine position of the rotatable inductive coupling element. The coarse position and fine position of the rotatable inductive coupling element 250 may then be combined utilizing a Vernier algorithm to provide to the position of the rotatable inductive coupling element 250. In general, angular information provided by the first annular sensor 160 provides coarse angular position information and information provided by the second annular sensor 150 provides fine angular position information, which are then processed by a Vernier algorithm to output position information. Hardware and software for implementing various other algorithms 740 may also be included. By sampling the signals with the ADCS 730 and computing the arc tangent of the digitized sine and cosine signals provided by the angular position sensor 200, the microprocessor 725 generate absolute position information of the rotatable inductive position element 250 as an output 750.

Figure 8B:
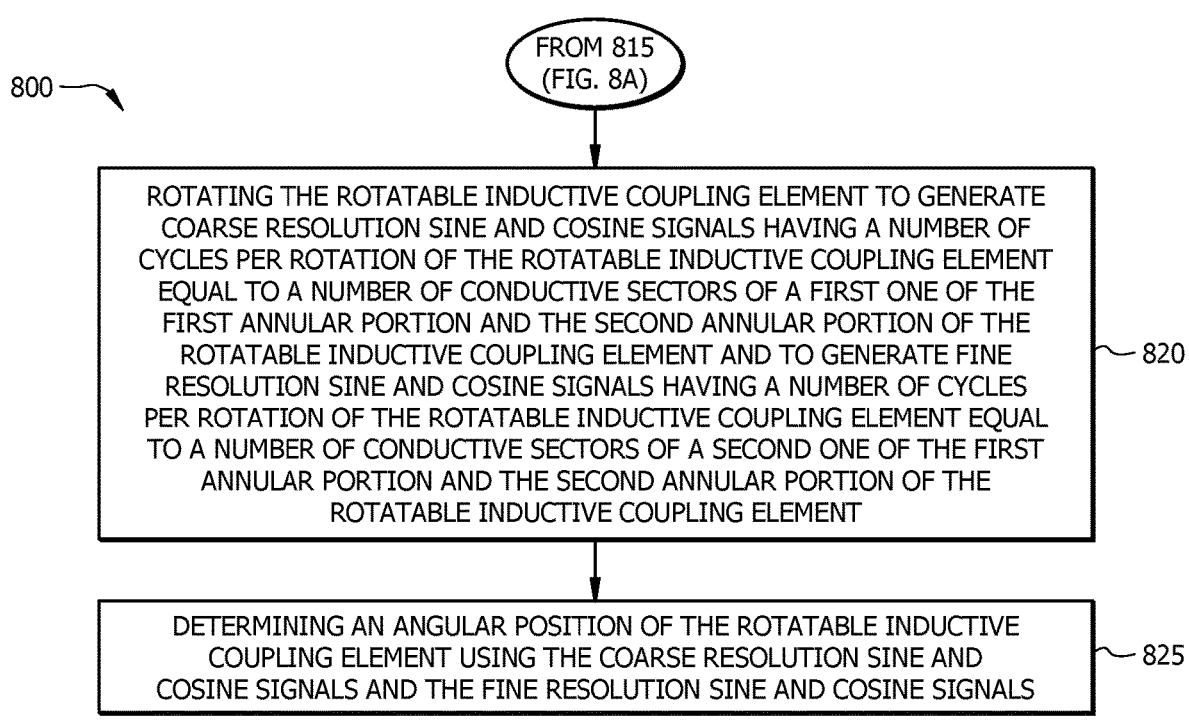
FIG. 8B is a second portion of the flow diagram of FIG. 8A, in accordance with an embodiment of the present invention.

FIGS. 8A and 8B illustrate a flow diagram of a method 800 for sensing an angular position of a rotatable inductive coupling element, in accordance with an embodiment of the present invention.

At operation 805 of FIG. 8A, the method includes, establishing a magnetic coupling in a first annular sensor, the first annular sensor comprising a first planar excitation coil and a first planar sensing coil pair positioned within a circular interior area formed by the first planar excitation coil. With reference to FIG. 1, first annular sensor 160 comprising first planar excitation coil 110, first planar sensing coil pair 120 and first integrated circuit 130 of circuitry 125 for establishing a magnetic coupling in the first annular sensor 160 are provided.

At operation 810 of FIG. 8A, the method includes, establishing a magnetic coupling in a second annular sensor, the second annular sensor comprising a second planar excitation coil and a second planar sensing coil pair positioned within a circular interior area formed by the second planar excitation coil, wherein the second annular sensor is positioned to surround the first annular sensor. With reference to FIG. 1, second annular sensor 150 comprising second planar excitation coil 105, second planar sensing coil pair 115 and second integrated circuit 135 of circuitry 125 for establishing a magnetic coupling in the second annular sensor 160 are provided.

At operation 815 of FIG. 8A, the method continues by positioning a rotatable inductive coupling element in overlying relation to, and separated from the first annular sensor and the second annular sensor, the rotatable inductive coupling element comprising a first annular portion comprising at least one annular conductive sector and at least one annular non-conductive sector and a second annular portion comprising at least annular conductive sector and at least one annular non-conductive sector, and wherein a number of annular conductive sectors of the second annular portion is different than a number of annular conductive sectors of the first annular portion. Optionally, when the number of annular conductive sectors of the second annular portion is greater than the number of annular conductive sectors of the first annular portion and the number of annular conductive sectors of the first annular portion is greater than one, then the number of annular conductive sectors of the second annular portion is not an integer multiple of the number of annular conductive sectors of the first annular portion. Alternatively, when the number of annular conductive sectors of the first annular portion is greater than the number of annular conductive sectors of the second annular portion and the number of annular conductive sectors of the second annular portion is greater than one, then the number of annular conductive sectors of the first annular portion is not an integer multiple of the number of annular conductive sectors of the second annular portion. With reference to FIG. 2, a rotatable inductive coupling element 250 is positioned in overlying relation to, and separated from, the first annular sensor 160 and the second annular sensor 150. The rotatable inductive coupling element 250 includes first annular portion 290 comprising one annular conductive sector 245 and one annular non-conductive sector 240 and second annular portion 294 comprising six annular conductive portions 220, 222, 224, 226, 228, 230 and six annular non-conductive portions 202, 204, 206, 208, 210, 212, each of the annular non-conductive portions 202, 204, 206, 208, 210, 212 positioned annularly between a respective two of the annular conductive portions 220, 222, 224, 226, 228, 230.

At operation 820 of FIG. 8B, the method includes, rotating the rotatable inductive coupling element to generate coarse resolution sine and cosine signals having a number of cycles per rotation of the rotatable inductive coupling element equal to a number of conductive sectors of the first annular portion of the rotatable inductive coupling element and to generate fine resolution sine and cosine signals having a number of cycles per rotation of the rotatable inductive coupling element equal to a number of conductive sectors of the second annular portion of the rotatable inductive coupling element. With reference to FIG. 7, the sine 705 and cosine 710 signals are generated by the first annular sensor 160 to determine the coarse angular resolution and the sine 715 and cosine 720 signals are generated by the second annular sensor 150 to determine the fine angular resolution are illustrated.

At operation 825 of FIG. 8B, the method concludes by determining an angular position of the rotatable inductive coupling element using the coarse resolution sine and cosine signals and the fine resolution sine and cosine signals. As illustrated in FIG. 7, a microprocessor 725 can be used to determine the angular position from the sine and cosine signals provided by the angular position sensor 200. In particular, an algorithm 740, such as a Vernier algorithm, may be implemented in the microprocessor 725 to calculate cumulative position information extracted from the coarse resolution sine and cosine signals and from the fine resolution sine and cosine signals. In general, the coarse position information provided by the coarse resolution sine and cosine signals is added to the fine position information provided by the fine resolution sine and cosine signals to determine the actual position of the rotatable inductive coupling element.

The system and method of the present invention provides an improved, non-contact, inductive angular position sensor which utilizes a planar coil assembly that can be implemented on a multilayer printed circuit board (PCB) to provide improved accuracy and allow for a larger gap. The gap may be an air gap or may be comprise a vacuum or a fluid filled area, without limitation.

In one embodiment, portions of the angular position sensor may be implemented in an integrated circuit as a single semiconductor die. Alternatively, the integrated circuit may include multiple semiconductor die that are electrically coupled together such as, for example, a multi-chip module that is packaged in a single integrated circuit package.

The system and method of the present invention provides an improved, non-contact, inductive angular position sensor which utilizes a planar coil assembly that can be implemented on a multilayer printed circuit board (PCB) to provide improved accuracy and resolution by establishing a coarse output signal integrated with a fine output signal.

In various embodiments, portions of the system of the present invention may be implemented in a Field Programmable Gate Array (FPGA) or Application Specific Integrated Circuit (ASIC). As would be appreciated by one skilled in the art, various functions of circuit elements may also be implemented as processing steps in a software program. Such software may be employed in, for example, a digital signal processor, microcontroller or general-purpose computer.

Unless specifically stated otherwise as apparent from the discussion, it is appreciated that throughout the description, discussions utilizing terms such as "measuring", "determining", "generating", "applying", "sending", "encoding", "locking", or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

Further, for purposes of discussing and understanding the embodiments of the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

What I claim is:

1. An angular position sensor comprising:
   a first annular sensor comprising a first planar excitation coil having a clockwise winding portion and a counter-clockwise winding portion and a first planar sensing coil pair, wherein both the clockwise winding portion and the counter-clockwise winding portion of the first planar excitation coil are positioned adjacent to a same side of the first planar sensing coil pair;
   a second annular sensor positioned to surround the first annular sensor, the second annular sensor comprising a second planar excitation coil having a clockwise winding portion and a counter-clockwise winding portion and a second planar sensing coil pair, wherein both the clockwise winding portion and the counter-clockwise winding portion of the second planar excitation coil are positioned adjacent to a same side of the second planar sensing coil pair;
   a rotatable inductive coupling element positioned in overlying relation to, and separated from the first annular sensor and the second annular sensor by a gap, the rotatable inductive coupling element comprising:
      a first annular portion comprising at least one annular conductive sector and at least one annular non-conductive sector; and
      a second annular portion comprising at least one annular conductive sector and at least one annular non-conductive sector, and wherein a number of annular conductive sectors of the second annular portion is different than a number of conductive sectors of the first annular portion.

2. The angular position sensor of claim 1, wherein the first planar excitation coil forms a circular interior area and the
   first planar sensing coil pair is positioned within the circular interior area, the first planar sensing coil pair comprising a cosine sensing coil and a sine sensing coil, each of the cosine sensing coil and the sine sensing coil respectively comprising a clockwise winding portion and a counter-clockwise winding portion.

3. The angular position sensor of claim 1, wherein the second planar excitation coil is positioned to surround the first planar excitation coil and
   the second planar sensing coil pair is positioned between the first planar excitation coil and the second planar excitation coil, the second planar sensing coil pair comprising a cosine sensing coil and a sine sensing coil, each of the cosine sensing coil and the sine sensing coil comprising a respective clockwise winding portion and a respective counter-clockwise winding portion.

4. The angular position sensor of claim 1, wherein the number of annular conductive sectors of the second annular portion is greater than a number of conductive sectors of the first annular portion and wherein, when the number of annular conductive sectors of the first annular portion is greater than one, the number of annular conductive sectors of the second annular portion is not an integer multiple of the number of annular conductive sectors of the first annular portion.

5. The angular position sensor of claim 1, wherein the number of annular conductive sectors of the first annular portion is greater than a number of conductive sectors of the second annular portion and wherein, when the number of annular conductive sectors of the second annular portion is greater than one, the number of annular conductive sectors of the first annular portion is not an integer multiple of the number of annular conductive sectors of the second annular portion.

6. The angular position sensor of claim 1, wherein the annular conductive sectors of the first annular portion and the annular conductive sectors of the second annular portion of the rotatable inductive coupling element are comprised of a non-ferromagnetic conductive material.

7. The angular position sensor of claim 1, wherein the annular non-conductive sectors of the first annular portion and the annular non-conductive sectors of the second annular portion of the rotatable inductive coupling element are comprised of a material selected from a dielectric material and air.

8. The angular position sensor of claim 1, wherein the first annular portion and the second annular portion of the rotatable inductive coupling element are separated from each other by a third annular portion comprised of a dielectric material.

9. The angular position sensor of claim 1, wherein the first annular portion and the second annular portion of the rotatable inductive coupling element are continuous.

10. The angular position sensor of claim 1, wherein the at least one annular conductive sector of the first annular portion of the rotatable inductive coupling element comprises a plurality of annular conductive sectors and wherein each of the plurality of annular conductive sectors of the first annular portion is substantially evenly spaced on the first annular portion.

11. The angular position sensor of claim 1, wherein the plurality of annular conductive sectors of the second annular portion of the rotatable inductive coupling element are substantially evenly spaced about the second annular portion.

12. The angular position sensor of claim 1, wherein the at least one annular conductive sector of the first annular portion of the rotatable inductive coupling element comprises a percentage of a total area of the first annular portion selected from 50% and 75%.

13. The angular position sensor of claim 1, wherein the at least one annular conductive sector of the second annular portion of the rotatable inductive coupling element comprises a percentage of a total area of the second annular portion selected from 50% and 75%.

14. The angular position sensor of claim 1, wherein the first annular portion of the rotatable inductive coupling element comprises one 270° annular conductive sector and wherein the second annular portion of the rotatable inductive coupling element comprises six 30° annular conductive sectors, substantially evenly spaced about the second annular portion.

15. The angular position sensor of claim 1, wherein the first annular portion of the rotatable inductive coupling element comprises one 270° annular conductive sector and wherein the second annular portion of the rotatable inductive coupling element comprises six 45° annular conductive sectors, substantially evenly spaced about the second annular portion.

16. The angular position sensor of claim 1, wherein the first annular portion of the rotatable inductive coupling element comprises one 180° annular conductive sector and wherein the second annular portion of the rotatable inductive coupling element comprises four 45° annular conductive sectors, substantially evenly spaced about the second annular portion.

17. The angular position sensor of claim 1, wherein the first annular portion of the rotatable inductive coupling element is positioned in overlying relation to, and separated from, the first annular sensor and the second annular portion of the rotatable inductive coupling element is positioned in overlying relation to, and separated from, the second annular sensor.

18. The angular position sensor of claim 1, wherein the second annular portion of the rotatable inductive coupling element is positioned in overlying relation to, and separated from, the first annular sensor and the first annular portion of the rotatable inductive coupling element is positioned in overlying relation to, and separated from, the second annular sensor.

19. The angular position sensor of claim 1, wherein the first planar excitation coil forms a circular interior area and the first planar sensing coil pair is positioned within the circular interior area, the first planar sensing coil pair comprising a respective cosine sensing coil and a respective sine sensing coil, each of the respective cosine sensing coil and the respective sine sensing coil of the first planar sensing coil pair comprising a clockwise winding portion and a counter-clockwise winding portion and the second planar excitation coil is positioned to surround the first planar excitation coil and a second planar sensing coil pair positioned between the first planar excitation coil and the second planar excitation coil, the second planar sensing coil pair comprising a respective cosine sensing coil and a respective sine sensing coil, each of the respective cosine sensing coil and the respective sine sensing coil of the second planar sensing coil pair comprising a respective clockwise winding portion and a respective counter-clockwise winding portion, the angular position sensor further comprising:

circuitry coupled to the first planar excitation coil, the second planar excitation coil, the first planar sensing coil pair and the second planar sensing coil pair, the circuitry for;

providing an excitation signal to the first planar excitation coil and the second planar excitation coil to generate an alternating current (AC) magnetic field; and sensing modulated sine and cosine waveforms induced in the first planar sensing coil pair and the second planar sensing coil pair in response to a rotation of the rotatable inductive coupling element.

20. A method for determining an angular position of a rotatable inductive coupling element, the method comprising:

establishing a magnetic coupling in a first annular sensor, the first annular sensor comprising a first planar excitation coil having a clockwise winding portion and a counter-clockwise winding portion and a first planar sensing coil pair, wherein both the clockwise winding portion and the counter-clockwise winding portion of the first planar excitation coil are positioned adjacent to a same side of the first planar sensing coil pair, and wherein the first planar sensing coil pair comprises a respective cosine sensing coil and a respective sine sensing coil, each of the respective cosine sensing coil and the respective sine sensing coil of the first planar sensing coil pair comprising a respective clockwise winding portion and a respective counter-clockwise winding portion;

establishing a magnetic coupling in a second annular sensor positioned to surround the first annular sensor, the second annular sensor comprising a second planar excitation coil having a clockwise winding portion and a counter-clockwise winding portion and a second planar sensing coil pair, wherein both the clockwise winding portion and the counter-clockwise winding portion of the second planar excitation coil are positioned adjacent to a same side of the second planar sensing coil pair, and wherein, the second planar sensing coil pair comprises a respective cosine sensing coil and a respective sine sensing coil, each of the cosine sensing coil and the sine sensing coil of the second planar sensing coil pair comprising a respective clockwise winding portion and a respective counter-clockwise winding portion;

positioning a rotatable inductive coupling element in overlying relation to, and separated from the first annular sensor and the second annular sensor, the rotatable inductive coupling element comprising a first annular portion comprising at least one annular conductive sector and at least one annular non-conductive sector and a second annular portion comprising at least one annular conductive sector and at least one annular non-conductive sector, and wherein a number of annular conductive sectors of the second annular portion is different than a number of annular conductive sectors of the first annular portion;

rotating the rotatable inductive coupling element to generate coarse resolution sine and cosine signals having a number of cycles per rotation of the rotatable inductive coupling element equal to a number of annular conductive sectors of a first one of the first annular portion and the second annular portion of the rotatable inductive coupling element and to generate fine resolution sine and cosine signals having a number of cycles per rotation of the rotatable inductive coupling element equal to a number of annular conductive sectors of a second one of the first annular portion and the second annular portion of the rotatable inductive coupling element; and determining an angular position of the rotatable inductive coupling element using the coarse resolution sine and cosine signals and the fine resolution sine and cosine signals.

21. The method of claim 20, wherein the first planar sensing coil pair is positioned within a circular interior area formed by the first planar excitation coil.

22. The method of claim 20, wherein the second planar sensing coil is positioned within a circular interior area formed by the second planar excitation coil.

23. A method for determining an angular position of a rotatable inductive coupling element, the method comprising:
  establishing a magnetic coupling in a first annular sensor, the first annular sensor comprising a first planar excitation coil having a clockwise winding portion and a counter-clockwise winding portion and a first planar sensing coil pair positioned within a circular interior area formed by the clockwise winding portion and the counter-clockwise winding portion of the first planar excitation coil, the first planar sensing coil pair comprising a respective cosine sensing coil and a respective sine sensing coil, each of the respective cosine sensing coil and the respective sine sensing coil of the first planar sensing coil pair comprising a respective clockwise winding portion and a respective counter-clockwise winding portion;
  establishing a magnetic coupling in a second annular sensor, the second annular sensor comprising a second planar excitation coil having a clockwise winding portion and a counter-clockwise winding portion and a second planar sensing coil pair positioned with a circular interior area formed by the clockwise winding portion and the counter-clockwise winding portion of the second planar excitation coil, wherein the second annular sensor is positioned to surround the first annular sensor, the second planar sensing coil pair comprising a respective cosine sensing coil and a respective sine sensing coil, each of the cosine sensing coil and the sine sensing coil of the second planar sensing coil pair comprising a respective clockwise winding portion and a respective counter-clockwise winding portion;
  positioning a rotatable inductive coupling element in overlying relation to, and separated from the first annular sensor and the second annular sensor, the rotatable inductive coupling element comprising a first annular portion comprising at least one annular conductive sector and at least one annular non-conductive sector and a second annular portion comprising at least one annular conductive sector and at least one annular non-conductive sector, and wherein a number of annular conductive sectors of the second annular portion is different than a number of annular conductive sectors of the first annular portion;
  rotating the rotatable inductive coupling element to generate coarse resolution sine and cosine signals having a number of cycles per rotation of the rotatable inductive coupling element equal to a number of annular conductive sectors of a first one of the first annular portion and the second annular portion of the rotatable inductive coupling element and to generate fine resolution sine and cosine signals having a number of cycles per rotation of the rotatable inductive coupling element equal to a number of annular conductive sectors of a second one of the first annular portion and the second annular portion of the rotatable inductive coupling element; and
  determining an angular position of the rotatable inductive coupling element using the coarse resolution sine and cosine signals and the fine resolution sine and cosine signals.

24. The method of claim 23, wherein the first annular portion of the rotatable inductive coupling element is positioned in overlying relation to, and separated from, the first annular sensor and the second annular portion of the rotatable inductive coupling element is positioned in overlying relation to, and separated from, the second annular sensor.

25. The method of claim 23, wherein the second annular portion of the rotatable inductive coupling element is positioned in overlying relation to, and separated from, the first annular sensor and the first annular portion of the rotatable inductive coupling element is positioned in overlying relation to, and separated from, the second annular sensor.

26. The method of claim 23, wherein the number of annular conductive sectors of the second annular portion is greater than the number of annular conductive sectors of the first annular portion and wherein, when the number of annular conductive sectors of the first annular portion is greater than one, the number of annular conductive sectors of the second annular portion is not an integer multiple of the number of annular conductive sectors of the first annular portion.

27. The method of claim 23, wherein the number of annular conductive sectors of the first annular portion is greater than the number of annular conductive sectors of the second annular portion and wherein, when the number of annular conductive sectors of the second annular portion is greater than one, the number of annular conductive sectors of the first annular portion is not an integer multiple of the number of annular conductive sectors of the second annular portion.

* * * * *